US012233972B2

(12) United States Patent
Nagashima et al.

(10) Patent No.: US 12,233,972 B2
(45) Date of Patent: Feb. 25, 2025

(54) CONTROL DEVICE FOR VEHICLE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yugo Nagashima, Anjo (JP); Yuji Fujita, Okazaki (JP); Kazuma Hasegawa, Anjo (JP); Yuuta Kajisawa, Okazaki (JP); Takashi Koudai, Okazaki (JP); Masaharu Yamashita, Toyota (JP); Yosuke Yamashita, Nagoya (JP); Shintaro Takayama, Toyota (JP); Kazuaki Iida, Toyota (JP); Hiroyuki Katayama, Toyota (JP); Hiroki Tomizawa, Kariya (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 245 days.

(21) Appl. No.: 17/966,325

(22) Filed: Oct. 14, 2022

(65) Prior Publication Data
US 2023/0117373 A1 Apr. 20, 2023

(30) Foreign Application Priority Data

Oct. 15, 2021 (JP) .................................. 2021-169588
Jun. 24, 2022 (JP) .................................. 2022-102097

(51) Int. Cl.
*B62D 6/00* (2006.01)
*B60R 16/03* (2006.01)
(Continued)

(52) U.S. Cl.
CPC .............. *B62D 6/008* (2013.01); *B60R 16/03* (2013.01); *B62D 5/006* (2013.01); *H02P 5/74* (2013.01)

(58) Field of Classification Search
CPC ............ B62D 6/008; B62D 5/006; H02P 5/74
(Continued)

(56) References Cited

U.S. PATENT DOCUMENTS

2011/0035107 A1* 2/2011 Izutani ................. B62D 5/0475
701/41
2020/0180685 A1* 6/2020 Suzuki ................. B62D 5/0412
(Continued)

FOREIGN PATENT DOCUMENTS

JP 2007218822 A * 8/2007 ............... B62D 5/04
JP 2009-248850 A 10/2009
(Continued)

*Primary Examiner* — Isaac G Smith
(74) *Attorney, Agent, or Firm* — Oliff PLC

(57) ABSTRACT

A control device for a vehicle includes a plurality of control circuits configured to control a control object by starting in response to powering-on of a vehicle and to perform power latch control for continuing to be supplied with electric power in a predetermined period in response to powering-off of the vehicle. Each of the control circuits is configured to perform starting after all of the control circuits have recognized the powering-on of the vehicle in a case where the vehicle is powered on while the power latch control is being performed after the vehicle has been powered off.

9 Claims, 12 Drawing Sheets

(51) Int. Cl.
    *B62D 5/00*        (2006.01)
    *H02P 5/74*        (2006.01)

(58) Field of Classification Search
    USPC .............................................. 701/41
    See application file for complete search history.

(56) References Cited

U.S. PATENT DOCUMENTS

| | | |
|---|---|---|
| 2020/0207406 A1 | 7/2020 | Endoh et al. |
| 2022/0258794 A1 | 8/2022 | Takesaki et al. |

FOREIGN PATENT DOCUMENTS

| | | | | |
|---|---|---|---|---|
| JP | 2019021605 A | * | 2/2019 | ............... B62D 5/04 |
| JP | 2020-108327 A | | 7/2020 | |
| JP | 2021-75182 A | | 5/2021 | |

\* cited by examiner

CONTROL DEVICE FOR VEHICLE

CROSS-REFERENCE TO RELATED APPLICATION

This application claims priority to Japanese Patent Application No. 2021-169588 filed on Oct. 15, 2021 and Japanese Patent Application No. 2022-102097 filed on Jun. 24, 2022, each incorporated herein by reference in its entirety.

BACKGROUND

1. Technical Field

The disclosure relates to a control device for a vehicle.

2. Description of Related Art

There has been a so-called steer-by-wire steering system in which transmission of power between a steering wheel and turning wheels is cut off. For example, a steer-by-wire system described in Japanese Unexamined Patent Application Publication No. 2021-075182 (JP 2021-075182 A) includes a reaction actuator and a turning actuator. The reaction actuator generates a steering reaction force which is applied to a steering shaft. The turning actuator generates a turning force for turning the turning wheels.

Each of the reaction actuator and the turning actuator includes two control arithmetic units which are redundantly provided and two motor driving units which are redundantly provided. Each control arithmetic unit performs an arithmetic operation associated with driving control for a motor. Each motor driving unit generates a torque based on a drive signal which is generated by the corresponding control arithmetic unit.

Two control arithmetic units of a first system and a second system in the reaction actuator can communicate with each other and cooperatively operate based on information transmitted and received therebetween. Two control arithmetic units of a first system and a second system in the turning actuator can communicate with each other and cooperatively operate based on information transmitted and received therebetween.

The control arithmetic unit of the first system in the reaction actuator and the control arithmetic unit of the first system in the turning actuator can communicate with each other. The control arithmetic unit of the second system in the reaction actuator and the control arithmetic unit of the second system in the turning actuator can communicate with each other. The two control arithmetic units of the first system and the two control arithmetic units of the second system cause the corresponding motor driving units to generate torques commonly using information transmitted and received through inter-system communication.

There has been an electric power steering system that assists an operation of a steering wheel. A control device for the electric power steering system causes an assist motor to generate an assist force based on a steering state of the steering wheel. For example, a control device described in Japanese Unexamined Patent Application Publication No. 2009-248850 (JP 2009-248850 A) performs power latch control for continuously performing control until a predetermined time elapses after an ignition key has been turned off. When a steering wheel is operated while power latch control is being performed, steering is assisted using a motor.

In a control device for an electric power steering system described in Japanese Unexamined Patent Application Publication No. 2020-108327 (JP 2020-108327 A), when a vehicle is powered off, power latch control for continuously performing, for example, a temperature estimating operation for an element on a board is performed after supply of a motor driving current has been stopped. The control device maintains a power-on state, i.e., continues to be supplied with electric power (i.e., continues to receive supply of electric power) until a predetermined time elapses after supply of the motor driving current has been stopped or until the temperature of an element on the board becomes equal to or less than a predetermined value.

SUMMARY

It is conceivable to perform power latch control as described in JP 2009-248850 A or JP 2020-108327 A in the steer-by-wire system including a plurality of systems as described in JP 2021-075182 A. In this case, the control arithmetic units individually perform the power latch control in response to powering-off of the vehicle due to an operation of an ignition key or the like. In the case where the vehicle is powered on while the power latch control is being performed, the control arithmetic units determine whether the vehicle has been powered on, and are restarted after it is determined that the vehicle has been powered on.

In the case where the vehicle is powered on while the power latch control is being performed, timings at which the control arithmetic units recognize powering-on of the vehicle may not match due to a difference in wiring resistance or the like. Accordingly, timings at which the control arithmetic units are restarted may not match. As a result, a control arithmetic unit that has been restarted earlier may output an unintended arithmetic result or perform an unintended state transition by receiving pre-initialization information calculated by another control arithmetic unit that is still performing the power latch control.

Particularly, in the case where the vehicle is powered on while the power latch control is being performed, for example, each control arithmetic unit operates until it recognizes powering-on of the vehicle, unlike a case in which the vehicle is firstly powered on. Accordingly, there is a high likelihood that each control arithmetic unit may output an unintended arithmetic result or perform an unintended state transition. In a steer-by-wire steering system in which transmission of power between the steering wheel and the turning wheels is cut off, when an unintended arithmetic result is output or an unintended state transition is performed, the reaction actuator and the turning actuator may not be appropriately controlled, which may give discomfort to a driver.

According to an aspect of the disclosure, there is provided a control device for a vehicle including a plurality of control circuits configured to start in response to powering-on of the vehicle to control a control object, and to perform power latch control for continuing to be supplied with electric power in a predetermined period in response to powering-off of the vehicle. Each of the control circuits is configured to perform starting after all of the control circuits have recognized the powering-on of the vehicle in a case where the vehicle is powered on while the power latch control is being performed after the vehicle has been powered off.

With this configuration, in the case where the vehicle is powered on while the power latch control is being performed after the vehicle has been powered off, each control circuit performs starting after the powering-on of the vehicle has been recognized by all of the control circuits. Accordingly, in the case where the vehicle is powered on while the power latch control is being performed after the vehicle has been powered off, it is possible to match the timings at which the control circuits start their starting even if the timings at which the powering-on of the vehicle is recognized by the control devices are different.

In the control device according to the aspect, the control circuits may be configured to set values of flags based on results of recognition as to whether the vehicle has been powered on. In this case, each of the control circuits may be configured to determine whether all of the control circuits have recognized the powering-on of the vehicle based on the values of the flags.

With this configuration, each control circuit can easily determine whether the powering-on of the vehicle has been recognized by all of the control circuits based on the values of the flags.

In the control device according to the aspect, the control object may include winding groups of two systems. The control object may include a reaction motor that generates a steering reaction force that is applied to a steering wheel provided such that transmission of power between the steering wheel and turning wheels is cut off, and a turning motor that generates a turning force for turning the turning wheels. In this case, the control circuits may include a first reaction control circuit configured to control supply of the electric power to a winding group of a first system in the reaction motor, a second reaction control circuit configured to control supply of the electric power to a winding group of a second system in the reaction motor, a first turning control circuit configured to control supply of the electric power to a winding group of the first system in the turning motor, and a second turning control circuit configured to control supply of the electric power to a winding group of the second system in the turning motor.

With this configuration, in the case where the vehicle is powered on while the power latch control is being performed after the vehicle has been powered off, it is possible to match the timings at which the control circuits start their starting even if the timings at which the powering-on of the vehicle is recognized by the first reaction control circuit and the second reaction control circuit which are configured to control supply of the electric power to the reaction motor and the first turning control circuit and the second turning control circuit which are configured to control supply of electric power to the turning motor are different. Accordingly, it is possible to appropriately control driving of the reaction motor and the turning motor.

In the control device according to the aspect, the first reaction control circuit and the second reaction control circuit may be configured to perform first mutual confirmation of mutually confirming whether the powering-on of the vehicle has been recognized. The first turning control circuit and the second turning control circuit may be configured to perform second mutual confirmation of mutually confirming whether the powering-on of the vehicle has been recognized. The first reaction control circuit and the first turning control circuit may be configured to perform third mutual confirmation of mutually confirming whether the first mutual confirmation and the second mutual confirmation have succeeded and to determine that the powering-on of the vehicle has been recognized by all the control circuits when the first mutual confirmation and the second mutual confirmation have succeeded. The second reaction control circuit and the second turning control circuit may be configured to perform fourth mutual confirmation of mutually confirming whether the first mutual confirmation and the second mutual confirmation have succeeded and to determine that the powering-on of the vehicle has been recognized by all the control circuits when the first mutual confirmation and the second mutual confirmation have succeeded.

With this configuration, it is possible to simplify signal paths in comparison with a configuration in which each of the first reaction control circuit and the second reaction control circuit and the first turning control circuit and the second turning control circuit mutually confirms the results of recognition of the powering-on of the vehicle with all the other control circuits. For example, it is not necessary to provide a communication line between the first reaction control circuit and the second turning control circuit and a communication line between the second reaction control circuit and the first turning control circuit.

In the control device according to the aspect, the control object may include a reaction motor that is a source of a steering reaction force that is applied to a steering wheel provided such that transmission of power between the steering wheel and turning wheels is cut off, and a turning motor that is a source of a turning force for turning the turning wheels. In this case, the control circuits may include a reaction control circuit configured to control the reaction motor and a turning control circuit configured to control the turning motor. The reaction control circuit and the turning control circuit may be configured to mutually confirm whether the powering-on of the vehicle has been recognized.

With this configuration, in the case where the vehicle is powered on while the power latch control is being performed after the vehicle has been powered off, it is possible to match the timings at which the reaction control circuit and the turning control circuit perform their starting even if the timings at which the reaction control circuit and the turning control circuit recognize the powering-on of the vehicle are different. Accordingly, it is possible to appropriately control driving of the reaction motor and the turning motor.

In the control device according to the aspect, the control object may include an assist motor that generates an assist force for assisting an operation of a steering wheel. The assist motor may include a winding group of a first system and a winding group of a second system. In this case, the control circuits may include a first assist control circuit configured to control supply of the electric power to the winding group of the first system and a second assist control circuit configured to control supply of the electric power to the winding group of the second system. The first assist control circuit and the second assist control circuit may be configured to mutually confirm whether the powering-on of the vehicle has been recognized.

With this configuration, in the case where the vehicle is powered on while the power latch control is being performed after the vehicle has been powered off, the first assist control circuit and the second assist control circuit perform their starting after both the first assist control circuit and the second assist control circuit have recognized the powering-on of the vehicle. Accordingly, in the case where the vehicle is powered on while power latch control is being performed after the vehicle has been powered off, it is possible to match the timings at which the first assist control circuit and the second assist control circuit perform their starting even if the timings at which the first assist control circuit and the second assist control circuit recognize the powering-on of the vehicle are different. As a result, it is possible to appropriately control driving of the assist motor.

In the control device according to the aspect, the control circuits may be configured to be able to perform communication with an onboard system that performs a process of causing the vehicle to transition to a state in which the vehicle is able to travel. In this case, each of the control circuits may be configured to be permitted to communicate with the onboard system after all of the control circuits have recognized the powering-on of the vehicle in the case where the vehicle is powered on while the power latch control is being performed after the vehicle has been powered off.

With this configuration, when not all of the control circuits have recognized the powering-on of the vehicle, the control circuits cannot communicate with the onboard system (i.e., until all of the control circuits have recognized the powering-on of the vehicle, the control circuits cannot communicate with the onboard system). Accordingly, it is possible to reduce the possibility that the control circuit that has earlier recognized the powering-on of the vehicle starts communication with the onboard system before all of the control circuits have recognized the powering-on of the vehicle.

In the control device according to the aspect, the control circuits may be configured to be able to perform communication with an onboard system that performs a process of causing the vehicle to transition to a state in which the vehicle is able to travel and to be permitted to communicate with the onboard system when the vehicle is powered on. The control circuits may include information indicating whether the onboard system is permitted to perform the process. In this case, the control circuits may be configured to change contents of the information from contents for permitting the onboard system to perform the process to contents for prohibiting the onboard system from performing the process as an initialization process for the information in a case where the vehicle is powered off while control of the control object is being performed, and to transmit the information to the onboard system in the case where the vehicle is powered on while the power latch control is being performed after the vehicle has been powered off.

In the case where the vehicle is powered on while the power latch control is being performed after the vehicle has been powered off, there is concern that a control circuit that has earlier recognized the powering-on of the vehicle may start communication with the onboard system before all of the control circuits have recognized the powering-on of the vehicle. At this time, there is concern that the control circuit that has earlier recognized the powering-on of the vehicle may transmit, to the onboard system, the information indicating whether the onboard system is permitted to perform the process of causing the vehicle to transition to the state in which the vehicle is able to travel. Here, contents of the information transmitted to the onboard system have been changed to contents for prohibiting the onboard system from performing the process of causing the vehicle to transition to the state in which the vehicle is able to travel. Accordingly, it is possible to reduce the possibility that the onboard system starts the process of causing the vehicle to transition to the state in which the vehicle is able to travel before all of the control circuits have recognized the powering-on of the vehicle.

In the control device according to the aspect, the control circuits may be configured to be able to perform communication with an onboard system that performs a process of causing the vehicle to transition to a state in which the vehicle is able to travel and to be permitted to communicate with the onboard system when the vehicle is powered on. The control circuits may include information indicating whether the onboard system is permitted to perform the process. In this case, the control circuits may be configured to maintain contents of the information set during control of the control object such that the contents are maintained to be contents for permitting the onboard system to perform the process, in a case where the vehicle is powered off while the control of the control object is being performed, and to transmit the information to the onboard system in the case where the vehicle is powered on while the power latch control is being performed after the vehicle has been powered off. In this case, each of the control circuits may be configured to perform a process of requesting the onboard system to ignore the information when not all of the control circuits have recognized the powering-on of the vehicle in the case where the vehicle is powered on while the power latch control is being performed after the vehicle has been powered off.

In the case where the vehicle is powered on while the power latch control is being performed after the vehicle has been powered off, there is concern that a control circuit that has earlier recognized the powering-on of the vehicle may start communication with the onboard system before all of the control circuits have recognized the powering-on of the vehicle. At this time, there is concern that the control circuit that has earlier recognized the powering-on of the vehicle may transmit, to the onboard system, information indicating whether the onboard system is permitted to perform the process of causing the vehicle to transition to the state in which the vehicle is able to travel.

The contents of the information indicating whether the onboard system is permitted to perform the process of causing the vehicle to transition to the state in which the vehicle is able to travel are maintained to be contents set during the control of the control object, that is, contents for permitting the onboard system to perform the process of causing the vehicle to transition to the state in which the vehicle is able to travel while the power latch control is being performed. Accordingly, there is concern that the onboard system may start the process of causing the vehicle to transition to the state in which the vehicle is able to travel before all of the control circuits have recognized the powering-on of the vehicle.

In this regard, with this configuration, the control circuit that has earlier recognized the powering-on of the vehicle performs the process of requesting the onboard system to ignore the information previously transmitted thereto when not all of the control circuits have recognized the powering-on of the vehicle in the case where the vehicle is powered on while power latch control is being performed after the vehicle has been powered off. Accordingly, it is possible to reduce the possibility that the onboard system starts the process of causing the vehicle to transition to the state in which the vehicle is able to travel before all of the control circuits have recognized the powering-on of the vehicle.

With the control device according to the aspect of the disclosure, it is possible to match the timings at which the control circuits start even in the case where the vehicle is powered on while the power latch control is being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a control device for a vehicle is embodied for a steer-by-wire steering system will be described.

Figure 1:
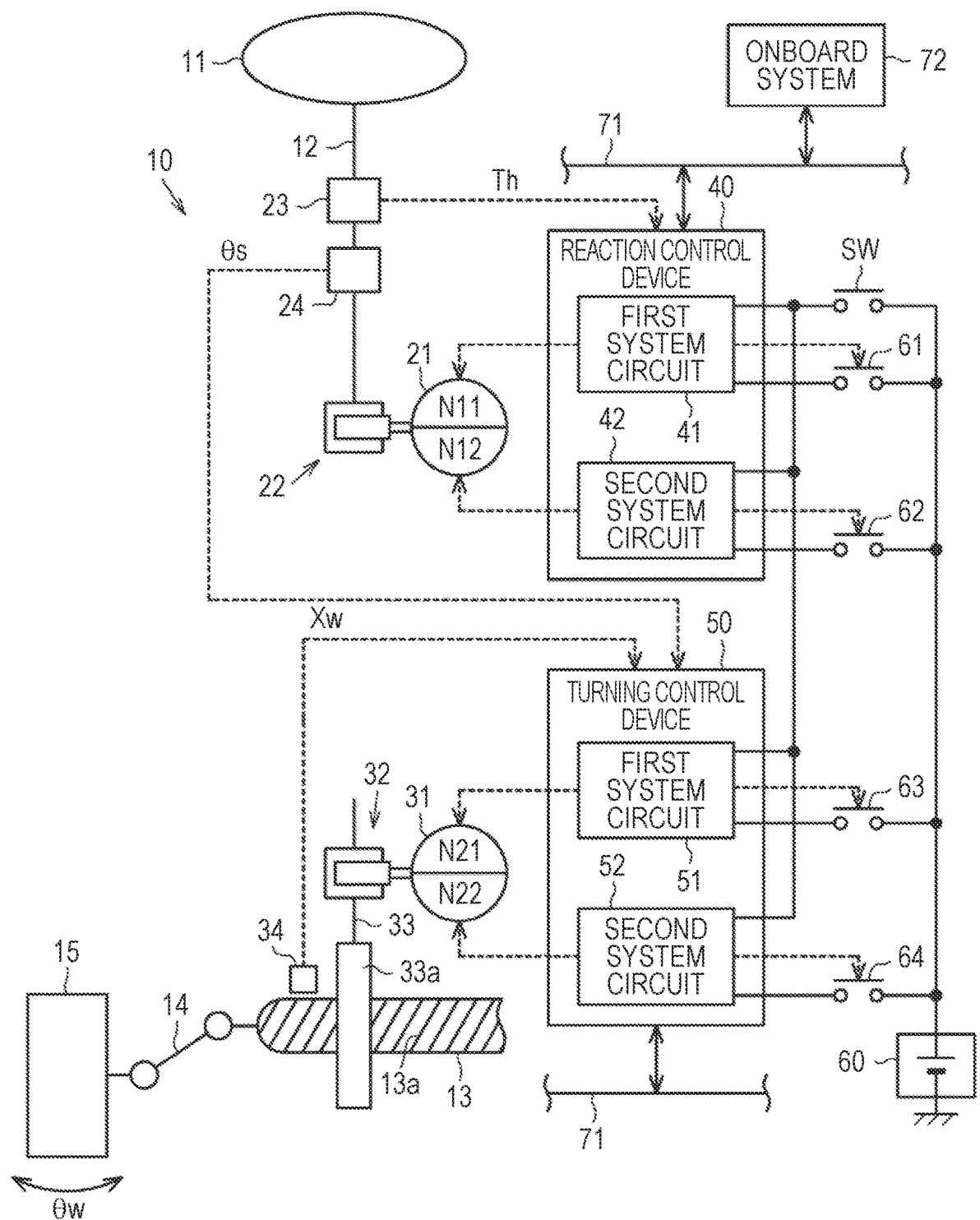
FIG. 1 is a diagram illustrating a configuration of a steer-by-wire steering system in which a control device for a vehicle according to a first embodiment is provided.

As illustrated in FIG. 1, a steering system 10 of a vehicle includes a steering shaft 12 that is connected to a steering wheel 11. The steering system 10 includes a turning shaft 13 that extends in a vehicle width direction (in a right-left direction in FIG. 1). Turning wheels 15 are respectively connected to both ends of the turning shaft 13 via tie rods 14. When the turning shaft 13 moves linearly, a turning angle θw of the turning wheels 15 changes. The steering shaft 12 and the turning shaft 13 constitute a steering mechanism of the vehicle. Only one turning wheel 15 is illustrated in FIG. 1.

The steering system 10 includes a reaction motor 21 and a speed reduction mechanism 22. The reaction motor 21 is a source of a steering reaction force. A steering reaction force is a force which acts in a direction opposite to an operating direction of the steering wheel 11 which is operated by a driver. A rotation shaft of the reaction motor 21 is connected to the steering shaft 12 via the speed reduction mechanism 22. A torque of the reaction motor 21 is applied as a steering reaction force to the steering shaft 12. An appropriate feeling of response can be given to the driver by applying the steering reaction force to the steering wheel 11.

The reaction motor 21 is, for example, a three-phase brushless motor. The reaction motor 21 includes a winding group N11 of a first system and a winding group N12 of a second system. The winding group N11 of the first system and the winding group N12 of the second system are wound on a common stator (not illustrated). The winding group N11 of the first system and the winding group N12 of the second system have the same electrical characteristics.

The steering system 10 includes a turning motor 31 and a speed reduction mechanism 32. The turning motor 31 is a source of a turning force. A turning force is a force for turning the turning wheels 15. A rotation shaft of the turning motor 31 is connected to a pinion shaft 33 via the speed reduction mechanism 32. Pinion teeth 33a of the pinion shaft 33 engage with rack teeth 13a of the turning shaft 13. A torque of the turning motor 31 is applied as a turning force to the turning shaft 13 via the pinion shaft 33. The turning shaft 13 moves in the vehicle width direction with rotation of the turning motor 31.

The turning motor 31 is, for example, a three-phase brushless motor. The turning motor 31 includes a winding group N21 of the first system and a winding group N22 of the second system. The winding group N21 of the first system and the winding group N22 of the second system are wound on a common stator (not illustrated). The winding group N21 of the first system and the winding group N22 of the second system have the same electrical characteristics.

The steering system 10 includes a reaction control device 40. The reaction control device 40 controls driving of the reaction motor 21 which is a control object. The reaction control device 40 performs reaction control such that a steering reaction force corresponding to a steering torque Th is generated by the reaction motor 21. The reaction control device 40 calculates a target steering reaction force based on the steering torque Th detected by a torque sensor 23. The torque sensor 23 is provided in the steering shaft 12. The reaction control device 40 controls supply of electric power to the reaction motor 21 such that an actual steering reaction force applied to the steering shaft 12 reaches the target steering reaction force. The reaction control device 40 controls supply of electric power to the winding groups of two systems in the reaction motor 21 independently according to each system.

The reaction control device 40 includes a first system circuit 41 and a second system circuit 42. The first system circuit 41 controls supply of electric power to the winding group N11 of the first system in the reaction motor 21 based on the steering torque Th detected by the torque sensor 23. The second system circuit 42 controls supply of electric power to the winding group N12 of the second system in the reaction motor 21 based on the steering torque Th detected by the torque sensor 23.

The steering system 10 includes a turning control device 50. The turning control device 50 controls driving of the turning motor 31 which is a control object. The turning control device 50 performs turning control for causing the turning motor 31 to generate a turning force for turning the turning wheels 15 based on a steering state. The turning control device 50 receives a steering angle θs detected by a steering angle sensor 24 and a stroke Xw of the turning shaft 13 detected by a stroke sensor 34. The stroke Xw is a displacement with respect to a neutral position of the turning shaft 13 and is a state variable in which a turning angle θw is reflected. The steering angle sensor 24 is provided between the torque sensor 23 and the speed reduction mechanism 22 in the steering shaft 12. The stroke sensor 34 is provided in the vicinity of the turning shaft 13.

The turning control device 50 calculates a target turning angle of the turning wheels 15 based on the steering angle θs detected by the steering angle sensor 24. The target turning angle can be acquired, for example, by multiplying the detected steering angle θs by a steering angle ratio. The steering angle ratio is a ratio of the turning angle θw to the steering angle θs. The steering angle ratio is a value which is preset depending on product specifications or the like. The turning control device 50 calculates a turning angle θw based on the stroke Xw of the turning shaft 13 detected by the stroke sensor 34. The turning control device 50 controls supply of electric power to the turning motor 31 such that the turning angle θw calculated based on the stroke Xw reaches the target turning angle. The turning control device 50 controls supply of electric power to the winding group of the second system in the turning motor 31 independently by the systems.

The turning control device 50 includes a first system circuit 51 and a second system circuit 52. The first system circuit 51 controls supply of electric power to the winding group N21 of the first system in the turning motor 31 based on the steering angle θs detected by the steering angle sensor 24 and the stroke Xw of the turning shaft 13 detected by the stroke sensor 34. The second system circuit 52 controls supply of electric power to the winding group N22 of the second system in the turning motor 31 based on the steering angle θs detected by the steering angle sensor 24 and the stroke Xw of the turning shaft 13 detected by the stroke sensor 34.

A so-called mechanically and electrically integrated reaction actuator may be constructed by integrally providing the reaction control device 40 and the reaction motor 21. A so-called mechanically and electrically integrated turning actuator may be constructed by integrally providing the turning control device 50 and the turning motor 31.

Power Supply Path

Power supply paths for the reaction control device 40 and the turning control device 50 will be described below. Various kinds of onboard devices including the reaction control device 40 and the turning control device 50 are supplied with electric power from a direct current (DC) power source 60 provided in the vehicle. The DC power source 60 is, for example, a battery. Various kinds of sensors including the torque sensor 23, the steering angle sensor 24, and the stroke sensor 34 are supplied with electric power from the DC power source 60.

The first system circuit 41 and the second system circuit 42 of the reaction control device 40 and the first system circuit 51 and the second system circuit 52 of the turning control device 50 are connected to the DC power source 60 via a start switch SW of the vehicle. The start switch SW is, for example, an ignition switch or a power switch. The start switch SW is operated when a traveling drive source of a vehicle such as an engine is started or stopped. When the start switch SW is turned on, electric power from the DC power source 60 is supplied to the first system circuit 41 and the second system circuit 42 of the reaction control device 40 and the first system circuit 51 and the second system circuit 52 of the turning control device 50 via the start switch SW. Turning on the start switch SW means powering on the vehicle. Turning off the start switch SW means powering off the vehicle.

The first system circuit 41 and the second system circuit 42 of the reaction control device 40 and the first system circuit 51 and the second system circuit 52 of the turning control device 50 are connected to the DC power source 60 via power supply relays 61, 62, 63, and 64. When the power supply relays 61, 62, 63, and 64 are turned on, electric power from the DC power source 60 is supplied to the first system circuit 41 and the second system circuit 42 of the reaction control device 40 and the first system circuit 51 and the second system circuit 52 of the turning control device 50 via the power supply relays 61, 62, 63, and 64.

The first system circuit 41 of the reaction control device 40 controls turning-on/off of the power supply relay 61. The first system circuit 41 performs power latch control for maintaining the power supply relay 61 in an ON state for a predetermined period in a case where the start switch SW is switched from an ON state to an OFF state. Accordingly, the first system circuit 41 can operate even after the start switch SW has been turned off. The first system circuit 41 can cut off supply of electric power to the first system circuit 41 by switching the power supply relay 61 from the on state to the off state when a predetermined period elapses.

The first system circuit 41 detects turning-on/off of the start switch SW, for example, by monitoring a voltage between both ends of the start switch SW. The first system circuit 41 detects that the start switch SW has been turned on when the voltage between both ends of the start switch SW is less than a predetermined voltage threshold value. The first system circuit 41 detects that the start switch SW has been turned off when the voltage between both ends of the start switch SW is equal to or greater than the predetermined voltage threshold value.

The second system circuit 42 of the reaction control device 40 controls turning-on/off of the power supply relay 62. Similarly to the first system circuit 41, the second system circuit 42 performs power latch control. The second system circuit 42 maintains the power supply relay 62 in an ON state for a predetermined period in the case where the start switch SW is switched from the ON state to the OFF state.

The first system circuit 51 of the turning control device 50 controls turning-on/off of the power supply relay 63. Similarly to the first system circuit 41 of the reaction control device 40, the first system circuit 51 performs power latch control. The first system circuit 51 maintains the power supply relay 63 in an ON state for a predetermined period in the case where the start switch SW is switched from the ON state to the OFF state.

The second system circuit 52 of the turning control device 50 controls turning-on/off of the power supply relay 64. Similarly to the first system circuit 41 of the reaction control device 40, the second system circuit 52 performs power latch control. The second system circuit 52 maintains the power supply relay 64 in an ON state for a predetermined period in the case where the start switch SW is switched from the ON state to the OFF state.

Elements such as the torque sensor 23, the steering angle sensor 24, and the stroke sensor 34 required to operate even after the start switch SW has been turned off among elements of the steering system 10 are connected to the DC power source 60 via at least one of the power supply relays 61, 62, 63, and 64. Accordingly, even in the case where the start switch SW is turned off, when at least one of the power supply relays 61, 62, 63, and 64 is turned on, the elements such as the torque sensor 23, the steering angle sensor 24, and the stroke sensor 34 are continuously supplied with electric power.

Reaction Control Device

Figure 2:
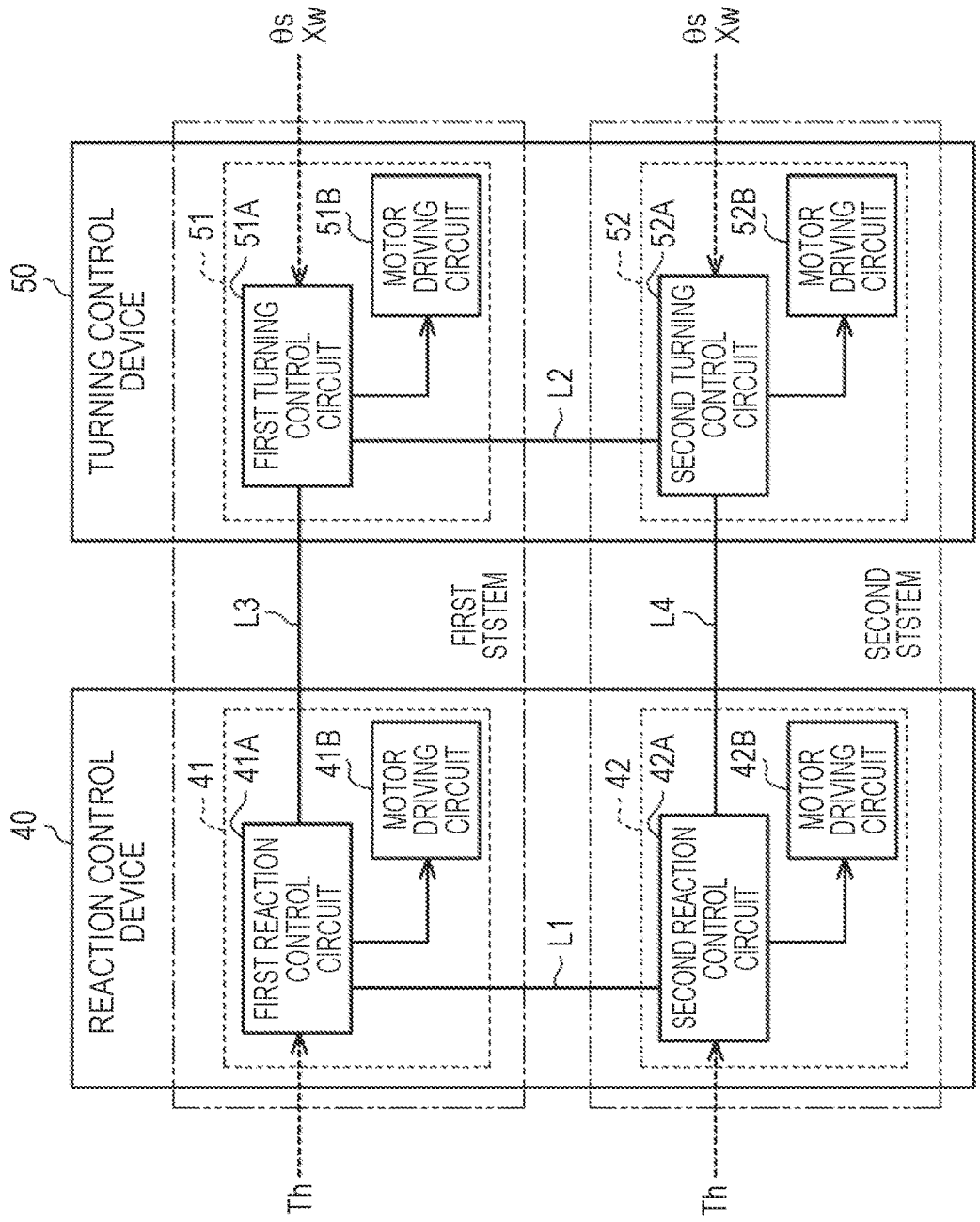
FIG. 2 is a block diagram illustrating a reaction control device and a turning control device according to the first embodiment.

The configuration of the reaction control device 40 will be described below in detail. As illustrated in FIG. 2, the reaction control device 40 includes the first system circuit 41 and the second system circuit 42. The first system circuit 41 includes a first reaction control circuit 41A and a motor driving circuit 41B. The second system circuit 42 includes a second reaction control circuit 42A and a motor driving circuit 42B.

The first reaction control circuit 41A is constituted by a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a central processing unit (CPU). The processor includes memories such as a random-access memory (RAM) and a read-only memory (ROM). The memories store program codes or commands configured to cause the CPU to perform processing. Memories, that is, non-transitory computer-readable media, include all available media that can be accessed by a general-purpose or dedicated computer.

The first reaction control circuit 41A calculates a target steering reaction force to be generated by the reaction motor 21 based on the steering torque Th detected by the torque sensor 23 and calculates a first current command value for the winding group N11 of the first system based on the value of the calculated target steering reaction force. Here, the first current command value is set to a value of a half (50%) of an amount of current (100%) required for the reaction motor 21 to generate the target steering reaction force. The first reaction control circuit 41A generates a drive signal (a PWM signal) for the motor driving circuit 41B by performing current feedback control for causing a value of an actual current supplied to the winding group N11 of the first system to conform to the first current command value.

The motor driving circuit 41B is a PWM inverter in which three legs corresponding to three phases (U, V, and W) are connected in parallel. Switching elements such as two field effect transistors (FETs) connected in series serve as a leg which is a basic unit. The motor driving circuit 41B converts DC electric power supplied from the DC power source 60 to three-phase AC electric power by switching the switching elements of the phases based on a drive signal generated by the first reaction control circuit 41A. The three-phase AC electric power generated by the motor driving circuit 41B is supplied to the winding group N11 of the first system in the reaction motor 21 via power supply paths of the phases including a bus bar or a cable. Accordingly, the winding group N11 of the first system generates a torque corresponding to the first current command value.

The second reaction control circuit 42A basically has the same configuration as that of the first reaction control circuit 41A. The second reaction control circuit 42A calculates a target steering reaction force to be generated by the reaction motor 21 based on the steering torque Th detected by the torque sensor 23 and calculates a second current command value for the winding group N12 of the second system based on the value of the calculated target steering reaction force. Here, the second current command value is set to a value of a half of the amount of current required for the reaction motor 21 to generate the target steering reaction force. The second reaction control circuit 42A generates a drive signal for the motor driving circuit 42B by performing current feedback control for causing a value of an actual current supplied to the winding group N12 of the second system to conform to the second current command value.

The motor driving circuit 42B basically has the same configuration as that of the motor driving circuit 41B. The motor driving circuit 42B converts DC electric power supplied from the DC power source 60 to three-phase AC electric power based on a drive signal generated by the second reaction control circuit 42A. The three-phase AC electric power generated by the motor driving circuit 42B is supplied to the winding group N12 of the second system in the reaction motor 21 via power supply paths of the phases including a bus bar or a cable. Accordingly, the winding group N12 of the second system generates a torque corresponding to the second current command value. The reaction motor 21 generates a total torque including the torque generated by the winding group N11 of the first system and the torque generated by the winding group N12 of the second system.

Depending on product specifications, a master-slave relationship may be provided between the first system circuit 41 and the second system circuit 42 of the reaction control device 40. In this case, for example, the first system circuit 41 may serve as a master and the second system circuit 42 may serve as a slave. Depending on product specifications, the first system circuit 41 and the second system circuit 42 may have an equivalent relationship.

Turning Control Device

The configuration of the turning control device 50 will be described below in detail. As illustrated in FIG. 2, the turning control device 50 includes the first system circuit 51 and the second system circuit 52. The first system circuit 51 includes a first turning control circuit 51A and a motor driving circuit 51B. The second system circuit 52 includes a second turning control circuit 52A and a motor driving circuit 52B.

The first turning control circuit 51A basically has the same configuration as that of the first reaction control circuit 41A. The first turning control circuit 51A calculates a target turning angle for the turning wheels 15 based on the steering angle $\theta s$ detected by the steering angle sensor 24. The turning control device 50 calculates a turning angle $\theta w$ based on the stroke Xw of the turning shaft 13 detected by the stroke sensor 34. The first turning control circuit 51A calculates a target turning force to be generated by the turning motor 31 by performing angle feedback control for causing the turning angle $\theta w$ calculated based on the stroke Xw to conform to the target turning angle and calculates a third current command value for the winding group N21 of the first system in the turning motor 31 based on the value of the calculated target turning force. Here, the third current command value is set to a value of a half (50%) of an amount of current (100%) required for the turning motor 31 to generate the target turning force. The first turning control circuit 51A generates a drive signal for the motor driving circuit 51B by performing current feedback control for causing a value of an actual current supplied to the winding group N21 of the first system to conform to the third current command value.

The motor driving circuit 51B basically has the same configuration as that of the motor driving circuit 41B. The motor driving circuit 51B converts DC electric power supplied from the DC power source 60 to three-phase AC electric power based on the drive signal generated by the first turning control circuit 51A. The three-phase AC electric power generated by the motor driving circuit 42B is supplied to the winding group N21 of the first system in the turning motor 31 via power supply paths of the phases including a bus bar or a cable. Accordingly, the winding group N21 of the first system generates a torque corresponding to the third current command value.

The second turning control circuit 52A basically has the same configuration as that of the first reaction control circuit 41A. The second turning control circuit 52A calculates a target turning angle for the turning wheels 15 based on a steering angle $\theta s$ detected by the steering angle sensor 24. The turning control device 50 calculates a turning angle $\theta w$ based on the stroke Xw of the turning shaft 13 detected by the stroke sensor 34. The second turning control circuit 52A calculates a target turning force to be generated by the turning motor 31 by performing angle feedback control for causing the turning angle $\theta w$ calculated based on the stroke Xw to conform to the target turning angle and calculates a fourth current command value for the winding group N22 of the second system in the turning motor 31 based on the value of the calculated target turning force. Here, the fourth current command value is set to a value of a half (50%) of the amount of current required for the turning motor 31 to generate the target turning force. The second turning control circuit 52A generates a drive signal for the motor driving circuit 52B by performing current feedback control for causing a value of an actual current supplied to the winding group N22 of the second system to conform to the fourth current command value.

The motor driving circuit 52B basically has the same configuration as that of the motor driving circuit 41B. The motor driving circuit 51B converts DC electric power supplied from the DC power source 60 to three-phase AC electric power based on the drive signal generated by the second turning control circuit 52A. The three-phase AC electric power generated by the motor driving circuit 52B is supplied to the winding group N22 of the second system in the turning motor 31 via power supply paths of the phases including a bus bar or a cable. Accordingly, the winding group N22 of the second system generates a torque corresponding to the fourth current command value. The turning motor 31 generates a total torque including the torque generated by the winding group N21 of the first system and the torque generated by the winding group N22 of the second system.

Depending on product specifications, a master-slave relationship may be provided between the first system circuit 51 and the second system circuit 52 of the turning control device 50. In this case, for example, the first system circuit 51 may serve as a master and the second system circuit 52 may serve as a slave. Depending on product specifications, the first system circuit 51 and the second system circuit 52 may have an equivalent relationship.

Communication Path

Internal communication paths of the reaction control device 40 and the turning control device 50 and a communication path between the reaction control device 40 and the turning control device 50 will be described below.

As illustrated in FIG. 2, the first reaction control circuit 41A and the second reaction control circuit 42A transmit and receive information therebetween via a communication line L1. The information includes abnormality information regarding the first reaction control circuit 41A, the second reaction control circuit 42A, or the motor driving circuit 41B or 42B. The information also includes values of various flags. The first reaction control circuit 41A and the second reaction control circuit 42A cooperatively control driving of the reaction motor 21 based on the information transmitted and received therebetween.

The first turning control circuit 51A and the second turning control circuit 52A transmit and receive information therebetween via a communication line L2. The information includes abnormality information regarding the first turning control circuit 51A, the second turning control circuit 52A, or the motor driving circuit 51B or 52B. The information also includes values of various flags. The first turning control circuit 51A and the second turning control circuit 52A cooperatively control driving of the turning motor 31 based on the information transmitted and received therebetween.

The first reaction control circuit 41A and the first turning control circuit 51A transmit and receive information therebetween via a communication line L3. The information includes abnormality information regarding the first reaction control circuit 41A, the first turning control circuit 51A, or the motor driving circuit 41B or 51B. The information also includes values of various flags. The first reaction control circuit 41A and the first turning control circuit 51A cooperatively control driving of the turning motor 31 based on the information transmitted and received therebetween.

The second reaction control circuit 42A and the second turning control circuit 52A transmit and receive information therebetween via a communication line L4. The information includes abnormality information regarding the second reaction control circuit 42A, the second turning control circuit 52A, or the motor driving circuit 42B or 52B. The information also includes values of various flags. The second reaction control circuit 42A and the second turning control circuit 52A cooperatively operate based on the information transmitted and received therebetween.

When an abnormality occurs in the first system circuits 41, 51 which are elements of the first system, the reaction motor 21 and the turning motor 31 are driven by the second system circuits 42, 52 which are elements of the second system. When an abnormality occurs in the second system circuits 42, 52 which are elements of the second system, the reaction motor 21 and the turning motor 31 are driven by the first system circuits 41, 51 which are elements of the first system.

For example, when an abnormality occurs in the first reaction control circuit 41A, the first reaction control circuit 41A stops its operation and the second reaction control circuit 42A continues to control supply of electric power to the winding group N12 of the second system in the reaction motor 21. In this case, the second reaction control circuit 42A may supply an amount of current corresponding to a half (50%) of an amount of current required for the reaction motor 21 to generate a target steering reaction force, to the winding group N12 of the second system. The second reaction control circuit 42A may supply an amount of current greater than a half of the amount of current required for the reaction motor 21 to generate the target steering reaction force, to the winding group N12 of the second system. This is determined depending on product specifications or the like. Only a torque generated by the winding group N12 of the second system in the reaction motor 21 is applied as the steering reaction force to the steering shaft 12.

When an abnormality occurs in the first reaction control circuit 41A, the first turning control circuit 51A stops its operation and the second turning control circuit 52A continues to control supply of electric power to the winding group N22 of the second system in the turning motor 31. In this case, the second turning control circuit 52A may supply an amount of current corresponding to a half (50%) of an amount of current required for the turning motor 31 to generate a target turning force, to the winding group N22 of the second system. The second turning control circuit 52A may supply an amount of current greater than a half of the amount of current required for the turning motor 31 to generate the target turning force, to the winding group N22 of the second system. This is determined depending on product specifications or the like. Only a torque generated by the winding group N22 of the second system in the turning motor 31 is applied as the turning force to the turning shaft 13.

Similarly, when an abnormality occurs in the second reaction control circuit 42A, the second reaction control circuit 42A stops its operation and the first reaction control circuit 41A continues to control supply of electric power to the winding group N11 of the first system in the reaction motor 21. When an abnormality occurs in the second reaction control circuit 42A, the second turning control circuit 52A stops its operation and the first turning control circuit 51A continues to control supply of electric power to the winding group N21 of the first system in the turning motor 31.

When an abnormality occurs in the first turning control circuit 51A or the second turning control circuit 52A, similarly to the case where an abnormality occurs in the first reaction control circuit 41A or the second reaction control circuit 42A, supply of electric power to the reaction motor 21 and the turning motor 31 continues to be controlled through a normal system. Each of the case where an abnormality occurs in the motor driving circuits 41B, 51B of the first system and the case where an abnormality occurs in the motor driving circuits 42B, 52B of the second system, supply of electric power to the reaction motor 21 and the turning motor 31 also continues to be controlled through a normal system.

State Transition of Control Circuit

State transitions of the control circuits (41A, 42A, 51A, and 52A) will be described below. As illustrated in the timing chart of FIG. 3, the first reaction control circuit 41A performs power latch control when the start switch SW is turned off in a state in which normal control is being performed (time T1). The second reaction control circuit 42A, the first turning control circuit 51A, and the second turning control circuit 52A also perform power latch control in response to turning-off of the start switch SW similarly to the first reaction control circuit 41A.

Normal control is control for generating a steering reaction force and a turning force according to a steering state of the steering wheel 11. In normal control, a torque is generated by both the winding group N11 of the first system and the winding group N12 of the second system in the reaction motor 21, and a torque is generated by both the winding group N21 of the first system and the winding group N22 of the second system in the turning motor 31. When the start switch SW is turned off, the vehicle stops.

The control circuits (41A, 42A, 51A, and 52A) perform power latch control after the start switch SW has been turned off and, for example, continue to perform an operation of estimating a temperature of elements on a board or the like. Examples of the elements include switching elements of the motor driving circuits (41B, 42B, 51B, and 52B). The control circuits continue to be supplied with electric power (i.e., continue to receive supply of electric power) until a predetermined time elapses after the start switch SW has been turned off or until the temperature of the elements on the board or the like becomes equal to or lower than a predetermined temperature. The predetermined temperature is a sufficiently low temperature.

When the temperature of the elements on the board or the like reaches the predetermined temperature, the control circuits store the temperature of the elements on the board or the like at that time in a nonvolatile memory and ends execution of power latch control. By performing the power latch control, the control circuits can accurately determine the initial temperature of the elements on the board or the like at the time of subsequently performing normal control and can appropriately perform overheating protection control. Overheating protection control is control for curbing overheating of the elements on the board or the like by limiting reaction control or turning control according to an increase in temperature from the initial temperature of the elements on the board or the like.

Here, it is assumed that the start switch SW is turned on again in a period in which power latch control is being performed after the start switch SW has been turned off. In this case, there is following concern. That is, when the start switch SW is turned on in the period in which power latch control is being performed, the timings at which the first reaction control circuit 41A, the second reaction control circuit 42A, the first turning control circuit 51A, and the second turning control circuit 52A recognize turning-on of the start switch SW may not match due to a difference in wiring resistance or the like.

An example of the timings at which the control circuits (41A, 42A, 51A, and 52A) recognize turning-on of the start switch SW is as follows. That is, when the start switch SW is turned on in the period in the period in which power latch control is being performed (time T2), the first reaction control circuit 41A recognizes the turning-on of the start switch SW at time T3. The second reaction control circuit 42A recognizes the tuning-on of the start switch SW at time T4. The first turning control circuit 51A recognizes the tuning-on of the start switch SW at time T5. The second turning control circuit 52A recognizes the tuning-on of the start switch SW at time T6. The temporal relationship between the times is the same as represented by Relational Expression (1).

$$T1<T2<T3<T5<T6<T4 \qquad (1)$$

For example, "T1<T2" means that time T2 is later than time T1.

Since the timings at which the control circuits (41A, 42A, 51A, and 52A) recognize the tuning-on of the start switch SW are different in this way, there is concern that the timings at which the control circuits start may be different. Therefore, in this embodiment, the control circuits perform first mutual confirmation MC1, second mutual confirmation MC2, third mutual confirmation MC3, and fourth mutual confirmation MC4 such that the timings at which they start match.

First Mutual Confirmation MC1

The first reaction control circuit 41A and the second reaction control circuit 42A perform first mutual confirmation MC1 for mutually confirming whether powering-on of the vehicle has been recognized. Specifically, this is as follows.

The first reaction control circuit 41A sets a value of a flag F11 according to a result of determination as to whether the start switch SW has been turned on. When it is determined that the start switch SW is in the OFF state, the first reaction control circuit 41A sets the value of the flag F11 to "0." When it is determined that the start switch SW has been turned on in the period in which power latch control is being performed (time T3), the first reaction control circuit 41A sets the value of the flag F11 to "1." The first reaction control circuit 41A transmits the value of the flag F11 to the second reaction control circuit 42A.

The second reaction control circuit 42A sets a value of a flag F21 according to a result of determination as to whether the start switch SW has been turned on. When it is determined that the start switch SW is in the OFF state, the second reaction control circuit 42A sets the value of the flag F21 to "0." When it is determined that the start switch SW has been turned on in the period in which power latch control is being performed (time T4), the second reaction control circuit 42A sets the value of the flag F21 to "1." The second reaction control circuit 42A transmits the value of the flag F21 to the first reaction control circuit 41A.

The first reaction control circuit 41A sets a value of a flag F12 according to the value of the flag F11 and the value of the flag F21. The value of the flag F12 indicates whether both the first reaction control circuit 41A and the second reaction control circuit 42A have recognized the tuning-on of the start switch SW, that is, whether the first mutual confirmation MC1 has succeeded. The first reaction control circuit 41A sets the value of the flag F12 to "0" when at least one of the value of the flag F11 and the value of the flag F21 is "0." This indicates that at least one of the first reaction control circuit 41A and the second reaction control circuit 42A has not recognized the tuning-on of the start switch SW. The first reaction control circuit 41A sets the value of the flag F12 to "1" when both the value of the flag F11 and the value of the flag F21 are "1." This indicates that both the first reaction control circuit 41A and the second reaction control circuit 42A have recognized the tuning-on of the start switch SW. The first reaction control circuit 41A transmits the value of the flag F12 to the first turning control circuit 51A.

The second reaction control circuit 42A sets a value of a flag F22 according to the value of the flag F11 and the value of the flag F21. Similarly to the flag F12, the value of the flag F22 indicates whether both the first reaction control circuit 41A and the second reaction control circuit 42A have recognized the tuning-on of the start switch SW, that is, whether the first mutual confirmation MC1 has succeeded. The second reaction control circuit 42A sets the value of the flag F22 to "0" when at least one of the value of the flag F11 and the value of the flag F21 is "0." The second reaction control circuit 42A sets the value of the flag F22 to "1" when both the value of the flag F11 and the value of the flag F21 are "1." The second reaction control circuit 42A transmits the value of the flag F22 to the second turning control circuit 52A.

Second Mutual Confirmation MC2

The first turning control circuit 51A and the second turning control circuit 52A perform second mutual confirmation MC2 for mutually confirming whether powering-on of the vehicle has been recognized. Specifically, this is as follows.

The first turning control circuit 51A sets a value of a flag F31 according to a result of determination as to whether the start switch SW has been turned on. When it is determined that the start switch SW is in the OFF state, the first turning control circuit 51A sets the value of the flag F31 to "0." When it is determined that the start switch SW has been turned on in the period in which power latch control is being performed (time T5), the first turning control circuit 51A sets the value of the flag F31 to "1." The first turning control circuit 51A transmits the value of the flag F31 to the second turning control circuit 52A.

The second turning control circuit 52A sets a value of a flag F41 according to a result of determination as to whether the start switch SW has been turned on. When it is determined that the start switch SW is in the OFF state, the second turning control circuit 52A sets the value of the flag F41 to "0." When it is determined that the start switch SW has been turned on in the period in which power latch control is being performed (time T6), the second turning control circuit 52A sets the value of the flag F41 to "1." The second turning control circuit 52A transmits the value of the flag F41 to the first turning control circuit 51A.

The first turning control circuit 51A sets a value of a flag F32 according to the value of the flag F31 and the value of the flag F41. The value of the flag F32 indicates whether both the first turning control circuit 51A and the second turning control circuit 52A have recognized the tuning-on of the start switch SW, that is, whether the second mutual confirmation MC2 has succeeded. The first turning control circuit 51A sets the value of the flag F32 to "0" when at least one of the value of the flag F31 and the value of the flag F41 is "0." This indicates that at least one of the first turning control circuit 51A and the second turning control circuit 52A has not recognized the tuning-on of the start switch SW. The first turning control circuit 51A sets the value of the flag F32 to "1" when both the value of the flag F31 and the value of the flag F41 are "1." This indicates that both the first turning control circuit 51A and the second turning control circuit 52A have recognized the tuning-on of the start switch SW. The first turning control circuit 51A transmits the value of the flag F32 to the first reaction control circuit 41A.

The second turning control circuit 52A sets a value of a flag F42 according to the value of the flag F31 and the value of the flag F41. Similarly to the flag F32, the value of the flag F42 indicates whether both the first turning control circuit 51A and the second turning control circuit 52A have recognized the tuning-on of the start switch SW, that is, whether the second mutual confirmation MC2 has succeeded. The second turning control circuit 52A sets the value of the flag F42 to "0" when at least one of the value of the flag F31 and the value of the flag F41 is "0." The second turning control circuit 52A sets the value of the flag F42 to "1" when both the value of the flag F31 and the value of the flag F41 are "1." The second turning control circuit 52A transmits the value of the flag F42 to the second reaction control circuit 42A.

Third Mutual Confirmation MC3

The first reaction control circuit 41A and the first turning control circuit 51A perform third mutual confirmation MC3 for mutually confirming whether the first mutual confirmation MC1 and the second mutual confirmation MC2 have succeeded. The first reaction control circuit 41A and the first turning control circuit 51A determine that all the control circuits (41A, 42A, 51A, and 52A) have recognized the powering-on of the vehicle when the first mutual confirmation MC1 and the second mutual confirmation MC2 have succeeded. Specifically, this is as follows.

The first reaction control circuit 41A sets a value of a flag F13 according to the value of the flag F12 and the value of the flag F32. The value of the flag F13 indicates whether all of the first reaction control circuit 41A, the second reaction control circuit 42A, the first turning control circuit 51A, and the second turning control circuit 52A have recognized the tuning-on of the start switch SW, that is, whether the first mutual confirmation MC1 and the second mutual confirmation MC2 have succeeded. When at least one of the value of the flag F12 and the value of the flag F32 is "0," the first reaction control circuit 41A determines that at least one of the first mutual confirmation MC1 and the second mutual confirmation MC2 has not succeeded and sets the value of the flag F13 to "0." When both the value of the flag F12 and the value of the flag F32 are "1," the first reaction control circuit 41A determines that the first mutual confirmation MC1 and the second mutual confirmation MC2 have succeeded and sets the value of the flag F13 to "1." The first reaction control circuit 41A starts in response to this setting (i.e., this setting serves as trigger) (time T7).

The first turning control circuit 51A sets a value of a flag F33 according to the value of the flag F12 and the value of the flag F32. Similarly to the flag F13, the value of the flag F33 indicates whether all of the first reaction control circuit 41A, the second reaction control circuit 42A, the first turning control circuit 51A, and the second turning control circuit 52A have recognized the tuning-on of the start switch SW, that is, whether the first mutual confirmation MC1 and the second mutual confirmation MC2 have succeeded. When at least one of the value of the flag F12 and the value of the flag F32 is "0," the first turning control circuit 51A determines that at least one of the first mutual confirmation MC1 and the second mutual confirmation MC2 has not succeeded and sets the value of the flag F33 to "0." When both the value of the flag F12 and the value of the flag F32 are "1," the first turning control circuit 51A determines that the first mutual confirmation MC1 and the second mutual confirmation MC2 have succeeded and sets the value of the flag F33 to "1." The first turning control circuit 51A starts in response to this setting (time T7).

Fourth Mutual Confirmation MC4

The second reaction control circuit 42A and the second turning control circuit 52A perform fourth mutual confirmation MC4 for mutually confirming whether the first mutual confirmation MC1 and the second mutual confirmation MC2 have succeeded. The second reaction control circuit 42A and the second turning control circuit 52A determine that all the control circuits (41A, 42A, 51A, and 52A) have recognized the powering-on of the vehicle when the first mutual confirmation MC1 and the second mutual confirmation MC2 have succeeded. Specifically, this is as follows.

The second reaction control circuit 42A sets a value of a flag F23 according to the value of the flag F22 and the value of the flag F42. Similarly to the flag F13, the value of the flag F23 indicates whether all of the first reaction control circuit 41A, the second reaction control circuit 42A, the first turning control circuit 51A, and the second turning control circuit 52A have recognized the tuning-on of the start switch SW, that is, whether the first mutual confirmation and the second mutual confirmation have succeeded. When at least one of the value of the flag F22 and the value of the flag F42 is "0," the second reaction control circuit 42A determines that at least one of the first mutual confirmation and the second mutual confirmation has not succeeded and sets the value of the flag F23 to "0." When both the value of the flag F22 and the value of the flag F42 are "1," the second reaction control circuit 42A determines that the first mutual confirmation and the second mutual confirmation have succeeded and sets the value of the flag F23 to "1." The second reaction control circuit 42A starts in response to this setting (time T7).

The second turning control circuit 52A sets a value of a flag F43 according to the value of the flag F22 and the value of the flag F42. Similarly to the flag F13, the value of the flag F43 indicates whether all of the first reaction control circuit 41A, the second reaction control circuit 42A, the first turning control circuit 51A, and the second turning control circuit 52A have recognized the tuning-on of the start switch SW, that is, whether the first mutual confirmation and the second mutual confirmation have succeeded. When at least one of the value of the flag F22 and the value of the flag F42 is "0," the second turning control circuit 52A determines that at least one of the first mutual confirmation and the second mutual confirmation has not succeeded and sets the value of the flag F43 to "0." When both the value of the flag F22 and the value of the flag F42 are "1," the second turning control circuit 52A determines that the first mutual confirmation and the second mutual confirmation have succeeded and sets the value of the flag F43 to "1." The second turning control circuit 52A starts in response to this setting (time T7).

In this way, when the start switch SW is turned on in the period in which power latch control is being performed, the control circuits (41A, 42A, 51A, and 52A) start at the same timing (time T7). The control circuits perform an initial sequence at the time of starting and then transition to a state in which normal control is performed. The initial sequence is a series of processes required for the steering system to start. The processes of the initial sequence include, for example, check of hardware, initialization of a CPU, and initialization of variables or flags.

Advantages of First Embodiment

Thus, according to the first embodiment, the following advantages can be achieved. (1-1) In the case where the vehicle is powered on while power latch control is being performed after the vehicle has been powered off, each of the control circuits (41A, 42A, 51A, and 52A) performs starting (i.e., starts a starting process) after the powering-on of the vehicle has been recognized by all of the control circuits. As a result, in the case where the vehicle is powered on while power latch control is being performed after the vehicle has been powered off, it is possible to match the timings at which the control circuits start their starting even if the timings at which the powering-on of the vehicle is recognized by the control devices are different. Accordingly, it is possible to appropriately control driving of the reaction motor 21 and the turning motor 31.

(1-2) The control circuits (41A, 42A, 51A, and 52A) set the values of the flags (F11, F21, F31, and F41) based on the results of recognition as to whether the vehicle has been powered on. Each of the control circuits can easily determine whether all the control circuits have recognized the powering-on of the vehicle based on the values of the flags.

(1-3) The first reaction control circuit 41A and the second reaction control circuit 42A perform the first mutual confirmation MC1 for mutually confirming whether the powering-on of the vehicle has been recognized through transmission and reception of the value of the flag F11 and the value of the flag F21. The first turning control circuit 51A and the second turning control circuit 52A perform the second mutual confirmation MC2 for mutually confirming whether the powering-on of the vehicle has been recognized through transmission and reception of the value of the flag F31 and the value of the flag F41. The first reaction control circuit 41A and the first turning control circuit 51A perform the third mutual confirmation MC3 for mutually confirming whether the first mutual confirmation MC1 and the second mutual confirmation MC2 have succeeded through transmission and reception of the value of the flag F12 and the value of the flag F32. The first reaction control circuit 41A and the first turning control circuit 51A determine that the powering-on of the vehicle has been recognized by all the control circuits when the first mutual confirmation MC1 and the second mutual confirmation MC2 have succeeded. The second reaction control circuit 42A and the second turning control circuit 52A perform the fourth mutual confirmation MC4 for mutually confirming whether the first mutual confirmation MC1 and the second mutual confirmation MC2 have succeeded through transmission and reception of the value of the flag F22 and the value of the flag F42. The second reaction control circuit 42A and the second turning control circuit 52A determine that the powering-on of the vehicle has been recognized by all the control circuits when the first mutual confirmation MC1 and the second mutual confirmation MC2 have succeeded. Accordingly, in comparison with a case in which each of the control circuits (41A, 42A, 51A, and 52A) mutually confirms the values of the flags (F11, F21, F31, and F41) with the other control circuits, it is possible to simplify signal paths. For example, it is not necessary to provide a communication line between the first reaction control circuit 41A and the second turning control circuit 52A and a communication line between the second reaction control circuit 42A and the first turning control circuit 51A.

Second Embodiment

A second embodiment in which a control device for a vehicle is embodied for an electric power steering system will be described below. The same elements as in the first embodiment will be referred to by the same reference signs, and detailed description thereof will be omitted.

In the electric power steering system, the steering wheel 11 and the turning wheels 15 illustrated in FIG. 1 are mechanically connected. That is, the steering shaft 12, the pinion shaft 33, and the turning shaft 13 serve as a power transmission path between the steering wheel 11 and the turning wheels 15. When the turning shaft 13 moves linearly with steering of the steering wheel 11, the turning angle θw of the turning wheels 15 changes.

The electric power steering system includes an assist motor and an assist control device. The assist motor is provided at the same position as the reaction motor 21 or the turning motor 31 illustrated in FIG. 1. The assist motor generates an assist force for assisting the operation of the steering wheel 11. The assist force is a torque in the same direction as the steering direction of the steering wheel 11. The assist control device controls driving of the assist motor which is a control object.

Figure 4:
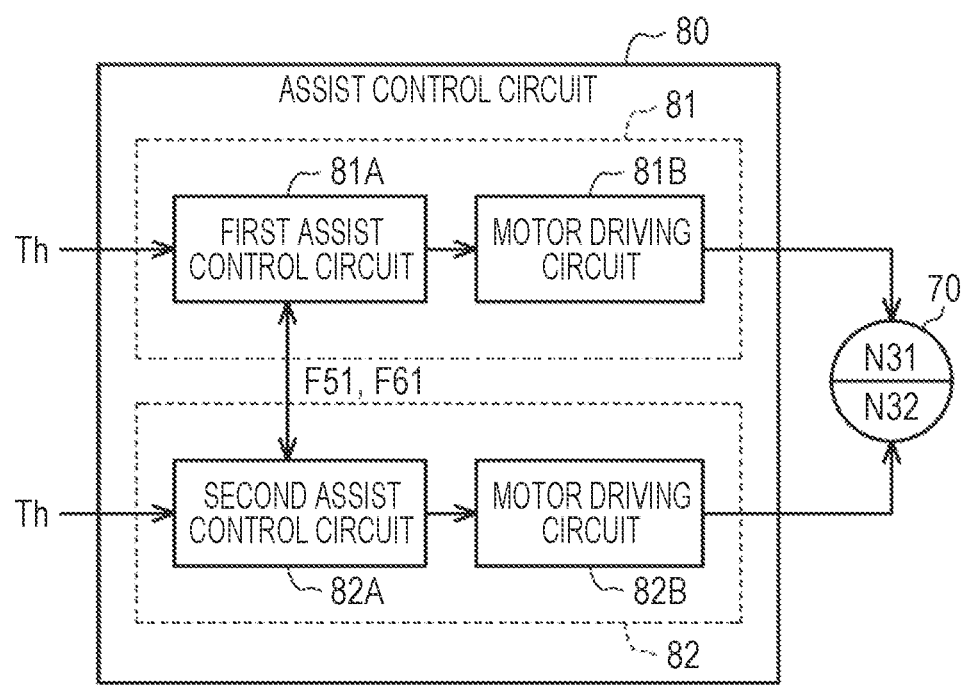
FIG. 4 is a diagram illustrating a configuration of a control device for a vehicle according to a second embodiment.

As illustrated in FIG. 4, the assist motor 70 includes a winding group N31 of the first system and a winding group N32 of the second system. The assist control device 80 includes a first system circuit 81. The first system circuit 81 includes a first assist control circuit 81A and a motor driving circuit 81B. The first assist control circuit 81A controls supply of electric power to the winding group N31 of the first system. The first assist control circuit 81A generates a drive signal for the motor driving circuit 81B based on a steering torque Th detected by the torque sensor 23.

The motor driving circuit 81B converts DC electric power supplied from the DC power source 60 to three-phase AC electric power based on the drive signal generated by the first assist control circuit 81A. The three-phase AC electric power generated by the motor driving circuit 81B is supplied to the winding group N31 of the first system in the assist motor 70 via power supply paths for the phases including a bus bar or a cable.

The assist control device 80 includes a second system circuit 82. The second system circuit 82 includes a second assist control circuit 82A and a motor driving circuit 82B. The second assist control circuit 82A controls supply of electric power to the winding group N32 of the second system. The second assist control circuit 82A generates a drive signal for the motor driving circuit 82B based on the steering torque Th detected by the torque sensor 23.

The motor driving circuit 82B converts DC electric power supplied from the DC power source 60 to three-phase AC electric power based on the drive signal generated by the second assist control circuit 82A. The three-phase AC electric power generated by the motor driving circuit 82B is supplied to the winding group N32 of the second system in the assist motor 70 via power supply paths for the phases including a bus bar or a cable.

The first assist control circuit 81A and the second assist control circuit 82A transmit and receive information therebetween via a communication line. The information includes abnormality information regarding the first assist control circuit 81A, the second assist control circuit 82A, or the motor driving circuit 81B or 82B. The information also includes values of various flags. The first assist control circuit 81A and the second assist control circuit 82A cooperatively control driving of the assist motor 70 based on the information transmitted and received therebetween.

When the start switch SW is turned off in a state in which normal control is being performed, the first assist control circuit 81A performs power latch control for continuing to be supplied with electric power (i.e., continuing to receive supply of electric power). The first assist control circuit 81A sets a value of a flag F51 based on a result of determination as to whether the start switch SW has been turned on. The first assist control circuit 81A sets the value of the flag F51 to "0" when it is determined that the start switch SW has been turned off. The first assist control circuit 81A sets the value of the flag F51 to "1" when it is determined that the start switch SW has been turned on in the period in which power latch control is being performed. The first assist control circuit 81A transmits the value of the flag F51 to the second assist control circuit 82A.

When the start switch SW is turned off in a state in which normal control is being performed, the second assist control circuit 82A performs power latch control for continuing to be supplied with electric power. The second assist control circuit 82A sets a value of a flag F61 based on a result of determination as to whether the start switch SW has been turned on. The second assist control circuit 82A sets the value of the flag F61 to "0" when it is determined that the start switch SW has been turned off. The second assist control circuit 82A sets the value of the flag F61 to "1" when it is determined that the start switch SW has been turned on in the period in which power latch control is being performed. The second assist control circuit 82A transmits the value of the flag F61 to the first assist control circuit 81A.

The first assist control circuit 81A and the second assist control circuit 82A determine whether both the first assist control circuit 81A and the second assist control circuit 82A have recognized the turning-on of the start switch SW based on the value of the flag F51 and the value of the flag F61.

When at least one of the value of the flag F51 and the value of the flag F61 is "0," the first assist control circuit 81A and the second assist control circuit 82A determine that at least one of the first assist control circuit 81A and the second assist control circuit 82A has not recognized the turning-on of the start switch SW.

When both the value of the flag F51 and the value of the flag F61 are "1," the first assist control circuit 81A and the second assist control circuit 82A determine that both the first assist control circuit 81A and the second assist control circuit 82A have recognized the turning-on of the start switch SW. The first assist control circuit 81A and the second assist control circuit 82A perform starting in response to this determination.

In this way, when the start switch SW is turned on in the period in which power latch control is being performed, the first assist control circuit 81A and the second assist control circuit 82A perform their starting at the same timing. The first assist control circuit 81A and the second assist control circuit 82A perform an initial sequence at the time of starting and then transition to a state in which normal control is performed.

Advantages of Second Embodiment

Accordingly, the following advantages can be achieved in the second embodiment. (2-1) In the case where the vehicle is powered on while power latch control is being performed after the vehicle has been powered off, the first assist control circuit 81A and the second assist control circuit 82A perform their starting (i.e., start their starting process) after both the first assist control circuit 81A and the second assist control circuit 82A have recognized the powering-on of the vehicle. Accordingly, in the case where the vehicle is powered on while power latch control is being performed after the vehicle has been powered off, it is possible to match the timings at which the first assist control circuit 81A and the second assist control circuit 82A perform their starting even if the timings at which the first assist control circuit 81A and the second assist control circuit 82A recognize the powering-on of the vehicle are different. As a result, it is possible to appropriately control driving of the assist motor 70.

(2-2) The first assist control circuit 81A and the second assist control circuit 82A set the values of the flags F51 and F61 based on the results of determination as to whether the vehicle is powered on. The first assist control circuit 81A and the second assist control circuit 82A can easily determine whether both the first assist control circuit 81A and the second assist control circuit 82A have recognized the powering-on of the vehicle by confirming the values of the flags F51 and F61.

Third Embodiment

A third embodiment in which a control device for a vehicle is embodied for a steer-by-wire steering system will be described below. This embodiment basically has the same configuration as in the first embodiment illustrated in FIGS. 1 to 3. The same elements as in the first embodiment will be referred to by the same reference signs, and detailed description thereof will be omitted.

As illustrated in FIG. 1, the reaction control device 40 is connected to an onboard system 72 via an onboard network 71. The onboard network 71 is, for example, a controller area network (CAN). The reaction control device 40 and the onboard system 72 transmit and receive information via the onboard network 71. The turning control device 50 is connected to the onboard system 72 via the onboard network 71. The turning control device 50 and the onboard system 72 transmit and receive information via the onboard network 71.

The onboard system 72 includes, for example, a steering lock control device, a shift lock control device, a power train control device, and a meter control device. The steering lock control device controls an operation of a steering lock mechanism. The steering lock mechanism is a mechanism for restricting rotation of the steering wheel 11. The steering lock control device controls the operation of the steering lock mechanism such that the steering wheel 11 is unlocked when the start switch SW is turned on. A process of unlocking the steering wheel 11 is a process of causing the vehicle to transition to a state in which the vehicle is able to travel. The steering lock control device controls the operation of steering lock mechanism such that the steering wheel 11 is locked when the start switch SW is turned off.

The shift lock control device controls operation of a shift lock mechanism. The shift lock mechanism is a mechanism for restricting operation of a shift lever using a lock member. The shift lock control device controls the operation of the shift lock mechanism such that the shift lever is unlocked when the start switch SW is turned on in a state in which the shift lever is located in a parking range and a brake pedal is depressed. The process of unlocking the shift lever is a process of causing the vehicle to transition to a state in which the vehicle is able to travel. The shift lock control device controls the operation of the shift lock mechanism such that shift lever is locked when the start switch SW is turned off in a state in which the shift lever is located in the parking position.

The power train control device controls operation of the vehicle. More specifically, the power train control device controls a power train of the vehicle. The power train includes a traveling drive source for the vehicle and a power transmission mechanism. Examples of the traveling drive source include an engine and a motor. The power transmission mechanism is a mechanism for transmitting power generated by the traveling drive source to the driving wheels. The power train control device performs a predetermined starting preparation when the start switch SW is turned on. The starting preparation includes initial check including processes such as check of hardware, initialization of a CPU, and initialization of variables or flags and a process required for starting the power train of the vehicle. The power train control device starts the power train after the starting preparation has been completed. The process of starting the power train is a process of causing the vehicle to transition to the state in which the vehicle is able to travel.

The meter control device controls turning-on of an indicator lamp of a meter panel. The indicator lamp includes an alarm lamp configured to give an alarm regarding an abnormality or failure associated with traveling of the vehicle and an alarm lamp configured to give a warning or an alarm when a driver of the vehicle has not performed a correct operation. The alarm lamp emits different colors depending on an alarm level. For example, red indicates that an abnormality on which inspection needs to be immediately performed has occurred. Yellow indicates that an abnormality on which prompt inspection needs to be performed has occurred. Green indicates normality.

The first reaction control circuit 41A can perform communication via the onboard network 71 when a source voltage supplied via the start switch SW has a value in a predetermined operating voltage range. The operating voltage range is a range of a source voltage required for the control circuits (41A, 42A, 51A, and 52A) including the first reaction control circuit 41A to operate. The operating voltage range is set, for example, based on a viewpoint of securing reliability of communication. The first reaction control circuit 41A transmits various kinds of information to the onboard system 72 via the onboard network 71 when the source voltage supplied via the start switch SW reaches a value in the operating voltage range. The second reaction control circuit 42A, the first turning control circuit 51A, and the second turning control circuit 52A perform the same process as the process performed by the first reaction control circuit 41A.

The information includes, for example, following five flags (A1) to (A5): (A1) communication permission flag F71; (A2) first unlock permission flag F72; (A3) second unlock permission flag F73; (A4) start permission flag F74; and (A5) meter notification flag F75. The communication permission flag F71 is information indicating whether communication via the onboard network 71 has been permitted. The first reaction control circuit 41A sets a value of the communication permission flag F71 based on whether the source voltage supplied via the start switch SW is in a value in the operating voltage range. The first reaction control circuit 41A sets the value of the communication permission flag F71 to "permitted" when the source voltage supplied via the start switch SW is a value in the operating voltage range. When the value of the communication permission flag F71 is set to "permitted," it means that communication of the control circuits (41A, 42A, 51A, and 52A) via the onboard network 71 is permitted. The first reaction control circuit 41A sets the value of the communication permission flag F71 to "prohibited" when the voltage of electric power supplied via the start switch SW is a value outside of the operating voltage range. When the value of the communication permission flag F71 is set to "prohibited," it means that communication of the control circuits (41A, 42A, 51A, and 52A) via the onboard network 71 is not permitted.

The first unlock permission flag F72 is information indicating whether the steering lock control device is permitted to unlock the steering wheel 11. The first reaction control circuit 41A sets the value of the first unlock permission flag F72 based on whether the start switch SW has been turned on. Here, the first reaction control circuit 41A determines that the start switch SW has been turned on when the source voltage supplied via the start switch SW is a value in the operating voltage range. The first reaction control circuit 41A determines that the start switch SW has been turned off when the source voltage supplied via the start switch SW is a value outside of the operating voltage range.

The first reaction control circuit 41A sets the value of the first unlock permission flag F72 to "permitted" when the start switch SW has been turned on. When the value of the first unlock permission flag F72 is set to "permitted," it means that the steering lock control device is permitted to unlock the steering wheel 11. The first reaction control circuit 41A sets the value of the first unlock permission flag F72 to "prohibited" when the start switch SW has been turned off. When the value of the first unlock permission flag F72 is set to "prohibited," it means that the steering lock control device is not permitted to unlock the steering wheel 11.

The second unlock permission flag F73 is information indicating whether the shift lock control device is permitted to unlock the shift lever. The first reaction control circuit 41A sets the value of the second unlock permission flag F73 based on whether charging of the DC power source 60 has been completed. For example, when an amount of charged electric power of the DC power source 60 is greater than 90% of an amount of fully charged electric power, the first reaction control circuit 41A determines that charging of the DC power source 60 has been completed. When the amount of charged electric power of the DC power source 60 is equal to or less than 90% of the amount of fully charged electric power, the first reaction control circuit 41A determines that charging of the DC power source 60 has not been completed.

The first reaction control circuit 41A sets the value of the second unlock permission flag F73 to "permitted" when charging of the DC power source 60 has been completed. When the value of the second unlock permission flag F73 is set to "permitted," it means that the shift lock control device is permitted to unlock the shift lever. The first reaction control circuit 41A sets the value of the second unlock permission flag F73 to "prohibited" when charging of the DC power source 60 has not been completed. When the value of the second unlock permission flag F73 is set to "prohibited," it means that the shift lock control device is not permitted to unlock the shift lever.

The start permission flag F74 is information indicating whether starting of the power train is permitted. The first reaction control circuit 41A sets the value of the start permission flag F74 based on whether performing of an initial sequence has been completed. The first reaction control circuit 41A sets the value of the start permission flag F74 to "permitted" when performing of the initial sequence has been completed. When the value of the start permission flag F74 is set to "permitted," it means that the power train control device is permitted to start the power train. The first reaction control circuit 41A sets the value of the start permission flag F74 to "prohibited" when performing of the initial sequence has not been completed. When the value of the start permission flag F74 is set to "prohibited," it means that the power train control device is not permitted to start the power train.

The meter notification flag F75 is information indicating operating states of four control circuits (41A, 42A, 51A, and 52A) in the steer-by-wire system. The control circuits set the value of the meter notification flag F75 to "normal" when all the control circuits operate normally. The control circuits set the value of the meter notification flag F75 to "abnormal" when at least one of the control circuits does not operate normally or does not start. The control circuits set the value of the meter notification flag F75 to "abnormal," for example, when braking (or disconnection) of a power supply path to a specific control circuit among the control circuits has been detected.

The second reaction control circuit 42A, the first turning control circuit 51A, and the second turning control circuit 52A set the values of the flags (F71 to F75) similarly to the first reaction control circuit 41A.

Not all of the four control circuits (41A, 42A, 51A, and 52A) may have the functions of setting the values of the permission flags (F72, F73, and F74). That is, the functions of setting the permission flags may be distributed to the control circuits to be performed by the control circuits. In this case, there may be a control circuit that does not have the function of setting the permission flags.

For example, only the second reaction control circuit 42A may have the functions of setting the values of the first unlock permission flag F72 and the second unlock permission flag F73. The second reaction control circuit 42A and the first turning control circuit 51A may have the function of setting the value of the start permission flag F74. Only the first turning control circuit 51A may have the function of setting the value of the meter notification flag F75. All the control circuits may have the function of setting the value of the communication permission flag F71.

Accordingly, even when the start switch SW has been turned on, the vehicle does not transition to a state in which the vehicle is able to travel until the reaction control device 40 and the turning control device 50 reach a state in which normal control is able to be performed due to complete performing of the initial sequence. That is, unlocking of the steering wheel 11 and the shift lever and starting of the power train are not permitted until the state in which normal control is able to be performed has been reached. Accordingly, the vehicle can be prevented from transitioning to the state in which the vehicle is able to travel in a state in which normal control is not able to be performed by the reaction control device 40 and the turning control device 50. The vehicle can start its traveling in a state which is safer for a driver, that is, a state in which the vehicle is able to be turned to the driver's desired direction.

First Comparative Example of State Transition of Control Circuit

A first comparative example of state transition of the control circuits (41A, 42A, 51A, and 52A) will be described below.

Figure 5:
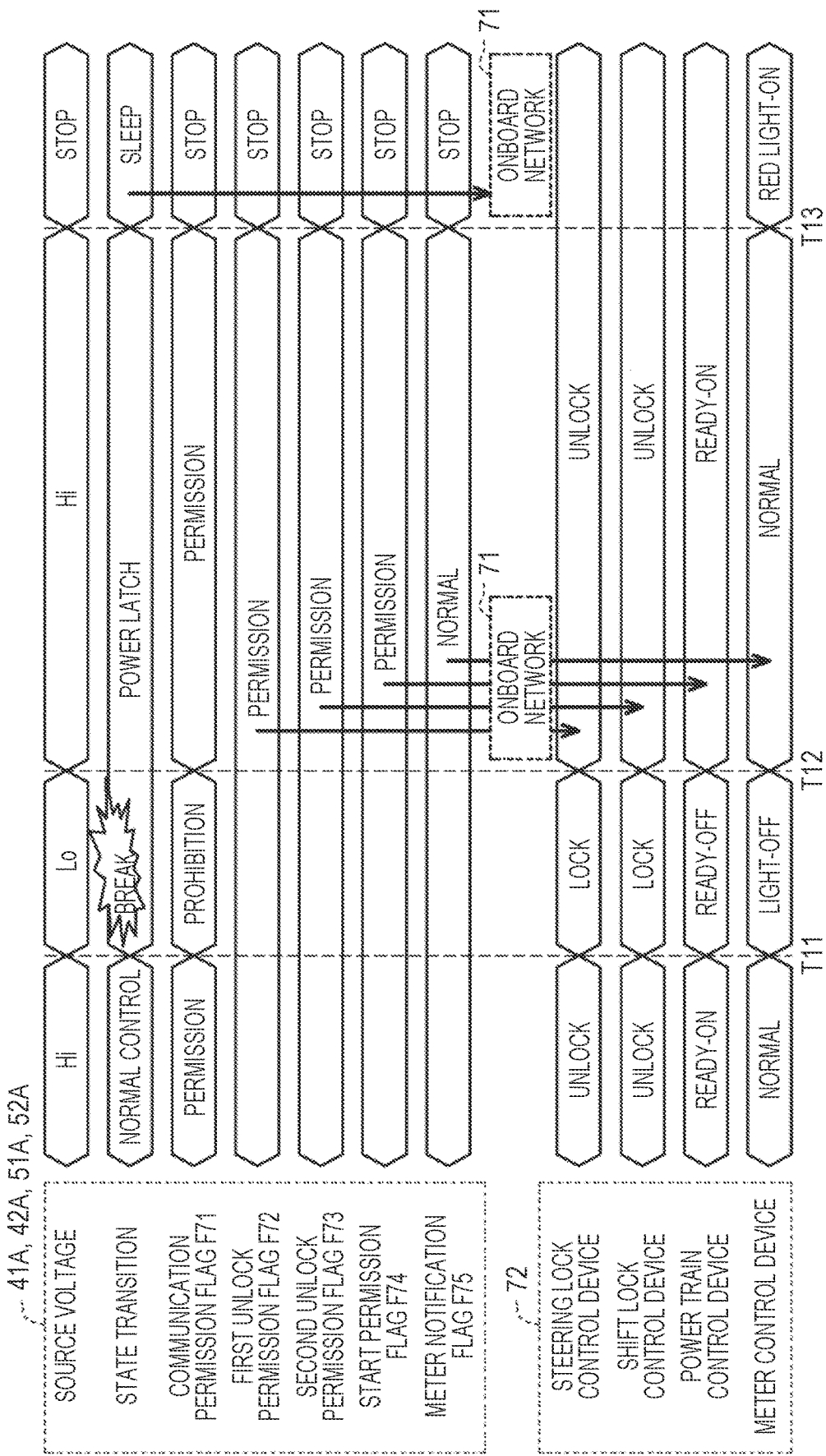
FIG. 5 is a timing chart illustrating state transitions of control circuits according to a first comparative example.

As illustrated in the timing chart of FIG. 5, the control circuits perform power latch control when the start switch SW is turned off in the state in which normal control is being performed (time T11). When the start switch SW is turned off, a level of a source voltage supplied to the control circuits (41A, 42A, 51A, and 52A) via the power supply paths including the start switch SW is switched from "Hi" to "Lo." "Hi" indicates that the source voltage is a value greater than a lower limit of the operating voltage range and less than an upper limit of the operating voltage range. "Lo" indicates that the source voltage is a value equal to or less than the lower limit of the operating voltage range. When the level of the source voltage is switched from "Hi" to "Lo," the value of the communication permission flag F71 is switched from "permitted" to "prohibited."

While power latch control is being performed, the value of the first unlock permission flag F72, the value of the second unlock permission flag F73, the value of the start permission flag F74, and the value of the meter notification flag F75 are kept at the same values as the values set during normal control performed immediately before the turning-off of the start switch SW. That is, the value of the first unlock permission flag F72, the value of the second unlock permission flag F73, and the value of the start permission flag F74 are kept "permitted." The value of the meter notification flag F75 is kept "normal." The values of the flags (F72, F73, F74, and F75) are reset, for example, when starting of the control circuits (41A, 42A, 51A, and 52A) have been determined, that is, when all the control circuits have recognized the turning-on of the start switch SW.

The steering lock control device switches the state of the steering wheel 11 from an unlocked state to a locked state using the steering lock mechanism when the start switch SW is turned off.

The shift lock control device switches the shift lever from an unlocked state to a locked state using the shift lock mechanism when the start switch SW is turned off.

The power train control device switches a state of the power train from "READY-ON" to "READY-OFF" when the start switch SW is turned off. "READY-ON" is a state in which starting preparation of the power train has been completed and is a state in which the power train can be started. "READY-OFF" is a state in which the operation of the power train has been stopped.

The meter control device switches the indicator lamp of the meter panel indicating the state of the steer-by-wire system from a turned-on state indicating the normal operation of the steer-by-wire system to a turned-off state indicating the stopped state of the steer-by-wire system when the start switch SW is turned off.

Here, it is assumed that the start switch SW is turned on again in the period in which power latch control is being performed after the start switch SW has been turned off (time T12). In this case, there is concern that the timings at which the control circuits (41A, 42A, 51A, and 52A) have recognized the turning-on of the start switch SW may not match due to a difference in wiring resistance or the like. There may be a situation in which a specific control circuit among the control circuits (41A, 42A, 51A, and 52A) cannot recognize the turning-on of the start switch SW due to breaking (i.e., break or disconnection) or the like of the power supply path to the specific control circuit. The power supply path is a power supply path including the start switch SW.

When such an event occurs, there is following concern. Here, for example, it is assumed that breaking occurs in the power supply path to the specific control circuit in a period (time T11 to time T12) until the start switch SW is turned on again while power latch control is being performed after the start switch SW has been turned off. The power supply path is a power supply path including the start switch SW. In this case, the specific control circuit is not supplied with a source voltage via the start switch SW. Accordingly, the specific control circuit cannot recognize the turning-on of the start switch SW. The specific control circuit does not start.

Accordingly, a situation in which all of the four control circuits (41A, 42A, 51A, and 52A) recognize the turning-on of the start switch SW cannot occur. The control circuits continue to perform power latch control without starting. The control circuits stop the power latch control and transition to a sleep state after a predetermined period has elapsed from the timing at which the start switch SW has been turned off (time T13). Sleep is a state in which the control circuits temporarily stop their operations and wait in a power-saving state. The control circuits transmit information indicating transition to the sleep state to the onboard system 72 via the onboard network 71 when they transition to the sleep state.

In the case where the start switch SW is turned on while power latch control is being performed, three control circuits other than a specific control circuit among four control circuits (41A, 42A, 51A, and 52A) are supplied with a source voltage via power supply paths including the start switch SW. The three control circuits other than the specific control circuit set the value of the communication permission flag F71 to "permitted" when the source voltage supplied with the turning-on of the start switch SW reaches a value in the operating voltage range.

While power latch control is being performed, three control circuits other than a specific control circuit maintain the value of the first unlock permission flag F72, the value of the second unlock permission flag F73, the value of the start permission flag F74, and the value of the meter notification flag F75 at the same values as the values set during normal control performed immediately before the turning-off of the start switch SW. That is, the value of the first unlock permission flag F72, the value of the second unlock permission flag F73, and the value of the start permission flag F74 are set to "permitted." The value of the meter notification flag F75 is set to "normal."

Accordingly, the three control circuits other than the specific control circuit transmit the values of the flags (F72, F73, F74, and F75) to the onboard system 72 via the onboard network 71 when the value of the communication permission flag F71 is switched from "prohibited" to "permitted" while power latch control is being performed. Accordingly, the steering lock control device can perform a process of unlocking the steering wheel 11. The shift lock control device can perform a process of unlocking the shift lever. The power train control device can perform a process of starting the power train.

Accordingly, even when the four control circuits (41A, 42A, 51A, and 52A) cannot start in the steer-by-wire system, the vehicle transitions to the state in which the vehicle is able to travel. Specifically, the process therefor is as follows.

The steering lock control device switches the steering wheel 11 from the locked state to the unlocked state using the steering lock mechanism based on the value of the first unlock permission flag F72 set to "permitted."

The shift lock control device switches the shift lever from the locked state to the unlocked state using the shift lock mechanism based on the value of the second unlock permission flag F73 set to "permitted."

The power train control device starts the predetermined starting preparation when the start switch is turned on. The starting preparation includes a process such as initial check required to start the power train. When the starting preparation has been completed, the power train is switched from the state of "READY-OFF" to the state of "READY-ON." That is, the power train transitions to a state in which the power train is able to start. The power train control device starts the power train based on the value of the start permission flag F74 set to "permitted."

The meter control device switches the indicator lamp of the meter panel indicating the state of the steer-by-wire system from a turned-off state indicating a stopped state of the steer-by-wire system to a turned-on state indicating a normal operation of the steer-by-wire system based on the value of the meter notification flag F75 set to "normal."

In this way, in the state in which the four control circuits do not start in the steer-by-wire system, the steering wheel 11 and the shift lever are unlocked and starting of the power train is permitted, whereby the vehicle transitions to the state in which the vehicle is able to travel.

The meter control device switches the state of the indicator lamp when information indicating that the control circuits transition to the sleep state is received via the onboard network 71 or when communication between the control circuits and the meter control device is cut off. For example, the meter control device switches the state of the indicator lamp from the state indicating the normal operation of the steer-by-wire system to the red turned-on state (i.e., red light-on state). The driver can visually recognize an abnormality of the steer-by-wire system after power latch control has been completed by the control circuits.

Even when the timings at which the four control circuits (41A, 42A, 51A, and 52A) recognize the turning-on of the start switch SW do not match, the same event occurs as in the case where breaking occurs in the power supply path including the start switch SW for a specific control circuit. That is, a control circuit that has recognized the turning-on of the start switch SW earlier transmits the values of the flags (F72, F73, F74, and F75) to the onboard system 72 via the onboard network 71. Accordingly, even when the four control circuits do not start in the steer-by-wire system, the vehicle may transition to the state in which the vehicle is able to travel.

Even with the configuration in which the functions of setting the values of the permission flags (F72, F73, and F74) are distributed to the control circuits to be performed by the control circuits, the same event occurs as in the case where breaking occurs in the power supply path including the start switch SW for a specific control circuit.

For example, when only the second reaction control circuit 42A has the function of setting the values of the first unlock permission flag F72 and the second unlock permission flag F73, it is assumed that the second reaction control circuit 42A recognizes the turning-on of the start switch SW earlier than the other three control circuits. In this case, the second reaction control circuit 42A transmits the value of the first unlock permission flag F72 and the value of the second unlock permission flag F73 to the onboard system 72 via the onboard network 71. Accordingly, even when the four control circuits do not start in the steer-by-wire system, the steering wheel 11 and the shift lever may be unlocked. The same event occurs when braking occurs in a power supply path to a specific control circuit other than the second reaction control circuit 42A, the power supply path including the start switch SW.

For example, when the second reaction control circuit 42A and the first turning control circuit 51A have the function of setting the value of the start permission flag F74, it is assumed that the second reaction control circuit 42A or the first turning control circuit 51A recognizes the turning-on of the start switch SW earlier than the other three control circuits. In this case, the second reaction control circuit 42A or the first turning control circuit 51A transmits the value of the start permission flag F74 to the onboard system 72 via the onboard network 71. Accordingly, even when the four control circuits do not start in the steer-by-wire system, the power train of the vehicle may start. The same event occurs when breaking occurs in a power supply path to a specific control circuit other than the second reaction control circuit 42A or the first turning control circuit 51A, the power supply path including the start switch SW.

Second Comparative Example of State Transition of Control Circuit

A second comparative example of state transition of the control circuits (41A, 42A, 51A, and 52A) will be described below.

Figure 6:
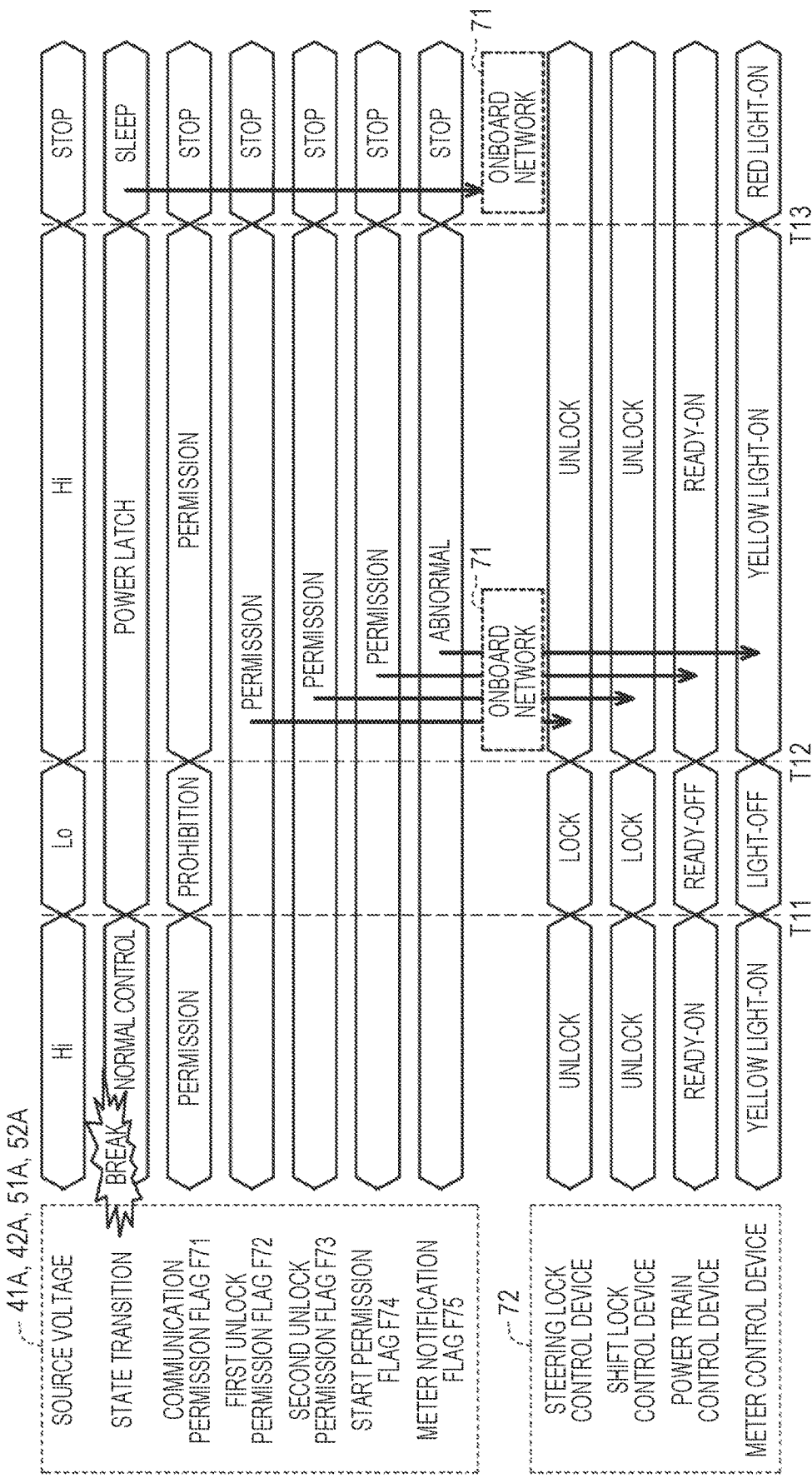
FIG. 6 is a timing chart illustrating state transitions of control circuits according to a second comparative example.

As illustrated in the timing chart of FIG. 6, there may be a situation in which a specific control circuit cannot recognize turning-on of the start switch SW due to breaking of a power supply path to the specific control circuit while normal control is being performed immediately before the tuning-off of the start switch SW. The power supply path is a power supply path including the start switch SW. In this case, when the start switch SW is turned on again in the period in which power latch control is being performed after the start switch SW has been turned off, the same event as the event in the first comparative example illustrated in FIG. 5 occurs.

Accordingly, even when the four control circuits do not start in the steer-by-wire system, the vehicle may transition to a state in which the vehicle is able to travel. In the configuration in which the functions of setting the values of the permission flags (F72, F73, and F74) are distributed to the control circuits to be performed by the control circuits, for example, there is following concern. That is, even when the four control circuits do not start in the steer-by-wire system, the steering wheel 11 and the shift lever may be unlocked or the power train may be started.

When breaking of a power supply path to a specific control circuit is detected during normal control performed immediately before the turning-off of the start switch SW, the control circuits set the value of the meter notification flag F75 to "abnormal." The meter control device switches the state of the indicator lamp to, for example, a yellow turned-on state (i.e., yellow light-on state) based on the value of the meter notification flag F75 set to "abnormal."

The value of the meter notification flag F75 is kept set to "abnormal" while power latch control is being performed after the turning-off of the start switch SW. Accordingly, when the start switch SW is turned on again in the period in which power latch control is being performed and the value of the communication permission flag F71 is set to "permitted," the meter control device switches the state of the indicator lamp to the yellow turned-on state based on the value of the meter notification flag F75 set to "abnormal."

In the period in which the start switch SW is in the turned-off state, the meter control device switches the state of the indicator lamp to the turned-off state (i.e., the light-off state). As in the first comparative example illustrated in FIG. 5 and the second comparative example illustrated in FIG. 6, it is not preferable that the vehicle transition to the state in which the vehicle is able to travel or the process of causing the vehicle to transition to the state in which the vehicle is able to travel be performed when the four control circuits do not start in the steer-by-wire system. This is because reaction control and turning control based on the steering state of the steering wheel 11 are not performed and thus the traveling direction of the vehicle cannot be changed to a driver's desired direction.

Therefore, in this embodiment, the following configurations are employed as the reaction control device 40 and the turning control device 50. The control circuits (41A, 42A, 51A, and 52A) set the value of the communication permission flag F71 to "permitted" when all of the following five conditions B1 to B5 are satisfied. Conditions B1 to B5 constitute communication permission conditions. The communication permission conditions are conditions for allowing the control circuits to determine whether communication via the onboard network 71 is permitted to be performed.

Condition B1 is a condition that the value of the communication permission flag F71 is set to "prohibited." Condition B2 is a condition that the value of a vehicle powering-on flag F76 is set to "ON." Condition B3 is a condition that the source voltage is greater than a lower limit of the operating voltage range.

Figure 3:
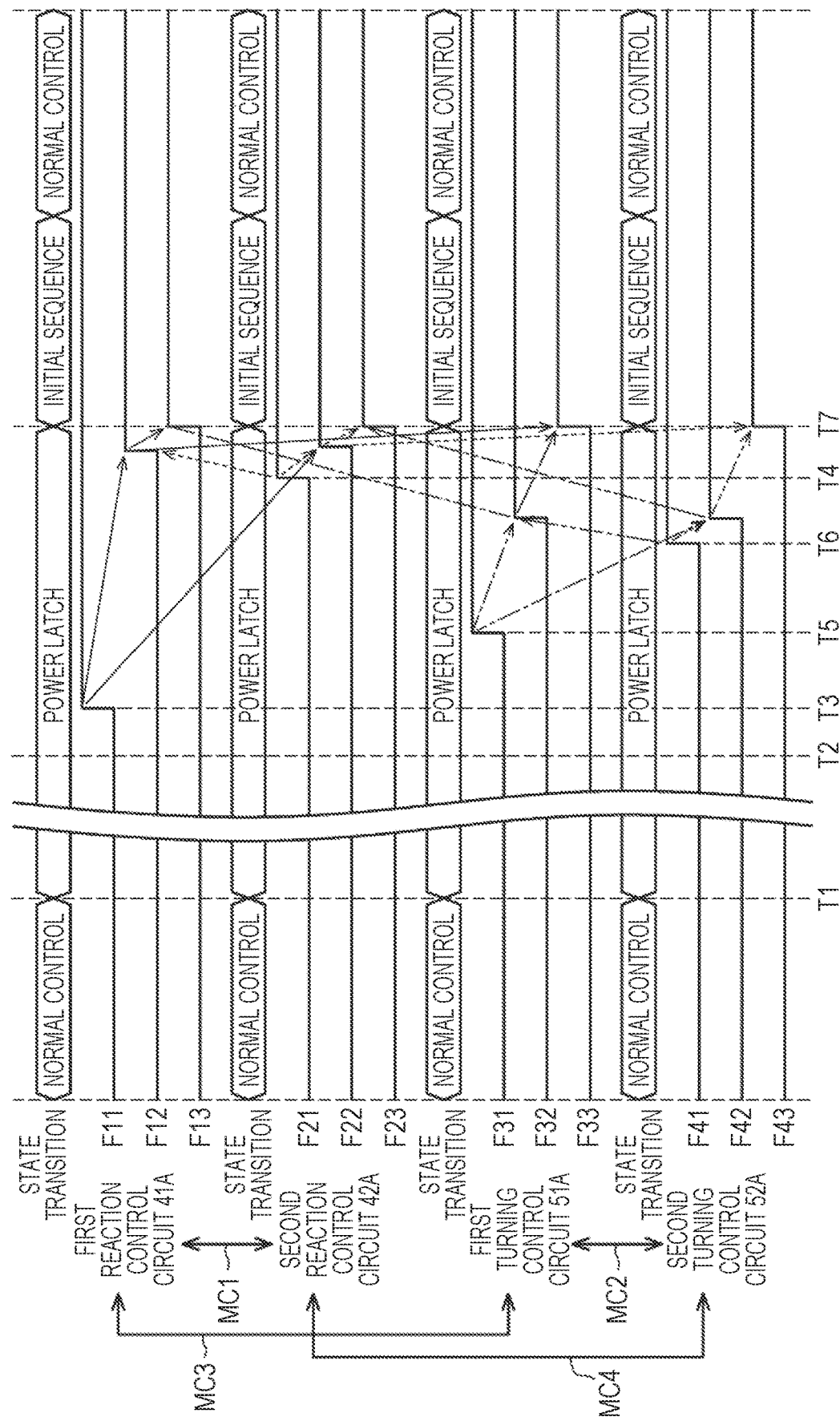
FIG. 3 is a timing chart illustrating state transitions of control circuits according to the first embodiment.

Condition B4 is a condition that the source voltage is less than the upper limit of the operating voltage range. Condition B5 is a condition that a state in which Conditions B1 to B4 are continuously satisfied for a set period or longer. The vehicle powering-on flag F76 is information indicating whether all the control circuits have recognized the turning-on of the start switch SW. The control circuits mutually confirm whether they have recognized the turning-on of the start switch SW, that is, whether they have recognized the powering-on of the vehicle, through the first mutual confirmation MC1, the second mutual confirmation MC2, the third mutual confirmation MC3, and the fourth mutual confirmation MC4 which are illustrated in FIG. 3. When it is determined that at least one of the control circuits has not recognized the turning-on of the start switch SW, the control circuits set the value of the vehicle powering-on flag F76 to "OFF." When it is determined that all the control circuits have recognized the turning-on of the start switch SW, the control circuits set the value of the vehicle powering-on flag F76 to "ON."

Conditions B3 and B4 are conditions for determining whether the source voltage recognized by the control devices is a value in the operating voltage range. Condition B5 is set, for example, for preventing the value of the communication permission flag F71 from being erroneously set to "permitted" when Conditions B1 to B4 are instantaneously satisfied.

Accordingly, each of the control circuits can perform communication via the onboard network 71 when it is determined that all the four control circuits have recognized the turning-on of the start switch SW.

First Mode of State Transition of Control Circuit

A first mode of state transition of the control circuits (41A, 42A, 51A, and 52A) according to this embodiment will be described below.

Here, it is assumed that breaking occurs in a power supply path to a specific control circuit in a period from a time point at which the start switch SW is turned off to a time point at which the start switch SW is turned on again while power latch control is being performed. The power supply path is a power supply path including the start switch SW. Accordingly, a source voltage is not supplied to the specific control circuit via the start switch SW. Thus, the specific control circuit cannot recognize the turning-on of the start switch SW. The specific control circuit does not start.

Figure 7:
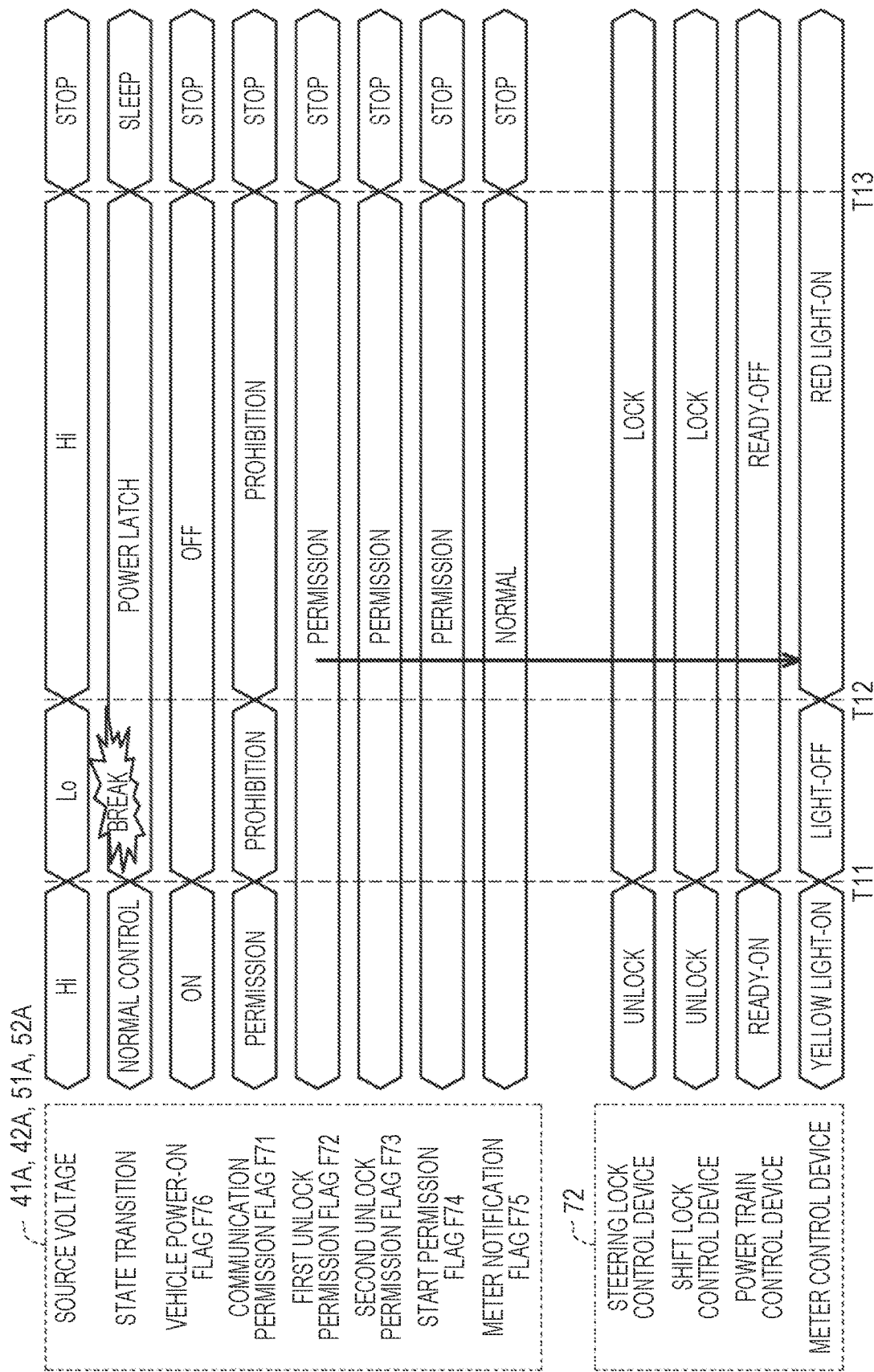
FIG. 7 is a timing chart illustrating a first mode of state transitions of control circuits according to a third embodiment.

As illustrated in the timing chart of FIG. 7, when the start switch SW is turned off in the state in which normal control is being performed (time T11), the control circuits perform power latch control. When the start switch SW is turned off, the level of the source voltage is switched from "Hi" to "Lo." Accordingly, when the start switch SW is turned off, the control circuits switch the value of the vehicle powering-on flag F76 from "ON" to "OFF." The control circuits switch the value of the communication permission flag F71 from "permitted" to "prohibited."

While power latch control is being performed, the value of the first unlock permission flag F72, the value of the second unlock permission flag F73, the value of the start permission flag F74, and the meter notification flag F75 are maintained at the same values as the values set in the state in which normal control is being performed immediately before the turning-off of the start switch SW. That is, the value of the first unlock permission flag F72, the value of the second unlock permission flag F73, and the value of the start permission flag F74 are kept "permitted." The value of the meter notification flag F75 is kept "normal."

When the start switch SW is turned on while power latch control is being performed (time T12), three control circuits other than the specific control circuit among four control circuits (41A, 42A, 51A, and 52A) are supplied with the source voltage via power supply paths including the start switch SW. Since supply of electric power to the specific control circuit via the start switch SW is cut off, the specific control circuit cannot recognize the turning-on of the start switch SW. Accordingly, a situation in which all of the four control circuits (41A, 42A, 51A, and 52A) have recognized the turning-on of the start switch SW cannot occur.

Accordingly, even when the level of the source voltage is actually switched from "Lo" to "Hi" with turning-on of the start switch SW while power latch control is being performed, the control circuits maintain the value of the vehicle powering-on flag F76 at "OFF." Since Conditions B2 and B5 of the aforementioned communication start determination conditions are not satisfied, the control circuits maintain the value of the communication permission flag F71 at "prohibited."

Since communication via the onboard network 71 is not permitted, three control circuits other than the specific control circuit do not transmit the values of the flags (F72, F73, F74, and F75) to the onboard system 72 via the onboard network 71.

Accordingly, the steering lock control device does not start the process of unlocking the steering wheel 11. The steering lock control device maintains the steering wheel 11 in the locked state. The shift lock control device does not start the process of unlocking the shift lever. The shift lock control device maintains the shift lever in the locked state. The power train control device does not start the process of starting the power train. The power train control device maintains the power train in the state of "READY-OFF," that is, the state in which the operation of the power train has been stopped.

Accordingly, the vehicle does not transition to the state in which the vehicle is able to travel when the four control circuits (41A, 42A, 51A, and 52A) cannot start in the steer-by-wire system.

When the start switch SW is turned on, the meter control device switches the state of the indicator lamp from the turned-off state to, for example, the red turned-on state. This is because the meter control device cannot communicate with the control circuits even when the start switch SW has been turned on. A driver can visually recognize an abnormality in the steer-by-wire system immediately without waiting for completion of power latch control which is performed by the control circuits.

The same applies to a case in which the timings at which the four control circuits (41A, 42A, 51A, and 52A) recognize the turning-on of the start switch SW do not match. That is, a control circuit that has earlier recognized the turning-on of the start switch SW does not transmit the values of the flags (F72, F73, F74, and F75) to the onboard system 72 via the onboard network 71. This is because communication via the onboard network 71 is not permitted until all of the four control circuits have recognized the turning-on of the start switch SW. Accordingly, the vehicle does not transition to the state in which the vehicle is able to travel when the four control circuits do not start in the steer-by-wire system.

The same applies to a case in which the functions of setting the values of the permission flags (F72, F73, and F74) are distributed to the control circuits to be performed by the control circuits. For example, when only the second reaction control circuit 42A has the functions of setting the values of the first unlock permission flag F72 and the second unlock permission flag F73, it is assumed that the second reaction control circuit 42A recognizes the turning-on of the start switch SW earlier than the other three control circuits. In this case, the second reaction control circuit 42A does not transmit the value of the first unlock permission flag F72 and the value of the second unlock permission flag F73 to the onboard system 72 via the onboard network 71. Accordingly, the steering wheel 11 and the shift lever are not unlocked when the four control circuits do not start in the steer-by-wire system. In addition, the same applies to a case in which breaking occurs in a power supply path to a specific control circuit other than the second reaction control circuit 42A. The power supply path is a power supply path including the start switch SW.

For example, when the second reaction control circuit 42A and the first turning control circuit 51A have the function of setting the value of the start permission flag F74, it is assumed that the second reaction control circuit 42A or the first turning control circuit 51A recognizes the turning-on of the start switch SW earlier than the other three control circuits. In this case, the second reaction control circuit 42A or the first turning control circuit 51A does not transmit the value of the start permission flag F74 to the onboard system 72 via the onboard network 71. Accordingly, the power train of the vehicle is not started when the four control circuits do not start in the steer-by-wire system. In addition, the same applies to a case in which breaking occurs in a power supply path to a specific control circuit other than the second reaction control circuit 42A or the first turning control circuit 51A. The power supply path is a power supply path including the start switch SW.

Second Mode of State Transition of Control Circuit

A second mode of state transition of the control circuits (41A, 42A, 51A, and 52A) according to this embodiment will be described below.

Figure 8:
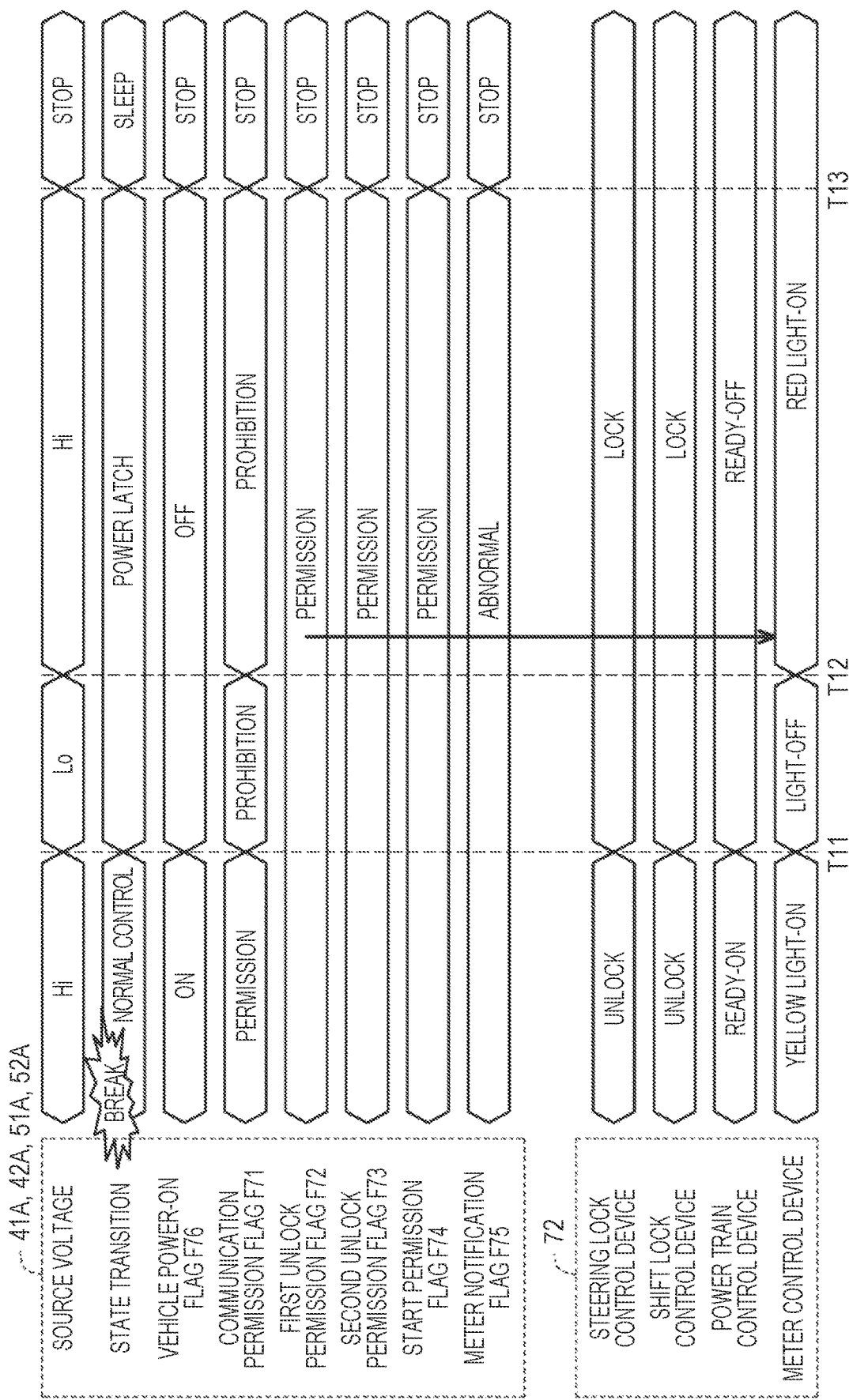
FIG. 8 is a timing chart illustrating a second mode of state transitions of the control circuits according to the third embodiment.

As illustrated in the timing chart of FIG. 8, there may be a situation in which a specific control circuit cannot recognize the turning-on of the start switch SW due to breaking or the like in a power supply path to the specific control circuit while normal control is being performed immediately before the turning-off of the start switch SW. The power supply path is a power supply path including the start switch SW. In this case, the control circuits perform the same processes as in the first mode illustrated in FIG. 7 when the start switch SW is turned on again in the period in which power latch control is being performed after the start switch SW has been turned off.

Accordingly, the vehicle does not transition to the state in which the vehicle is able to travel when the four control circuits do not start in the steer-by-wire system. The same applies to a case in which the functions of setting the values of the permission flags (F72, F73, and F74) are distributed to the control circuits to be performed by the control circuits. That is, the steering wheel 11 and the shift lever are not unlocked and the power train is not started when the control circuits do not start in the steer-by-wire system.

Advantages of Third Embodiment

Accordingly, the following advantages can be achieved in the third embodiment. (3-1) When the start switch SW is turned on, each of the four control circuits (41A, 42A, 51A, and 52A) performs starting (i.e., starts a starting process) after all the control circuits have recognized the turning-on of the start switch SW. When the start switch SW is turned on, communication via the onboard network 71 is not permitted until all of the four control circuits recognize the turning-on of the start switch SW. Accordingly, when there is a control circuit that has not recognized the turning-on of the start switch SW, another control circuit that has recognized the turning-on of the start switch SW cannot transmit the values of the flags (F72, F73, F74, and F75) to the onboard system 72. Accordingly, it is possible to prevent the vehicle from transitioning to the state in which the vehicle is able to travel or to prevent the process of causing the vehicle to transition to the state in which the vehicle is able to travel from being performed when the control circuits do not start in the steer-by-wire system.

(3-2) The meter control device switches the state of the indicator lamp from the turned-off state to the red turned-on state when the start switch SW has been turned on and the meter control device cannot communicate with the control circuits. The red turned-on state indicates that an abnormality has occurred in the steer-by-wire system. Accordingly, a driver can visually recognize an abnormality in the steer-by-wire system immediately without waiting for completion of power latch control in the control circuits.

Fourth Embodiment

A fourth embodiment in which a control device for a vehicle is embodied for a steer-by-wire steering system will be described below. This embodiment basically has the same configuration as in the first embodiment illustrated in FIGS. 1 to 3. The same elements as in the first embodiment will be referred to by the same reference signs, and detailed description thereof will be omitted.

This embodiment is different from the third embodiment in contents of the processes which are performed by the control circuits (41A, 42A, 51A, and 52A) when the start switch SW is turned off. The control circuits initialize the values of the flags transmitted to the onboard system 72 when all of the following three conditions C1 to C3 are satisfied. The flags transmitted to the onboard system 72 include a first unlock permission flag F72, a second unlock permission flag F73, a start permission flag F74, and a meter notification flag F75.

Condition C1 is a condition that a value of a control stop flag F77 is set to "stop." Condition C2 is a condition that a value of a vehicle powering-off flag F78 is set to "OFF." Condition C3 is a condition that the value of the communication permission flag F71 is set to "prohibited."

The control stop flag F77 is information indicating whether the control circuits have stopped reaction control or turning control. When reaction control or turning control is not stopped, the control circuits set the value of the control stop flag F77 to "non-stop." When reaction control or turning control is stopped, the control circuits set the value of the control stop flag F77 to "stop."

The vehicle powering-off flag F78 is information indicating whether all the control circuits have recognized turning-off of the start switch SW. The control circuits mutually confirm whether they have recognized the turning-off of the start switch SW, that is, whether they have recognized the powering-off of the vehicle, through the first mutual confirmation MC1, the second mutual confirmation MC2, the third mutual confirmation MC3, and the fourth mutual confirmation MC4 illustrated in FIG. 3. When it is determined that at least one of the control circuits has not recognized the turning-off of the start switch SW, the control circuits set the value of the vehicle powering-off flag F78 to "ON." When it is determined that all the control circuits have recognized the turning-off of the start switch SW, the control circuits set the value of the vehicle powering-off flag F78 to "OFF."

The communication permission flag F71 is information indicating whether communication via the onboard network 71 is permitted. The control circuits set the value of the communication permission flag F71 to "permitted" when all of the aforementioned five conditions B1 to B5 are satisfied. The control circuits set the value of the communication permission flag F71 to "prohibited" when the start switch SW is turned off.

The control circuits set the values of the first unlock permission flag F72, the second unlock permission flag F73, and the start permission flag F74 to "prohibited" as an initialization process. The control circuits switch the value of the meter notification flag F75 to a value corresponding to a current state of the steer-by-wire system as the initialization process.

First Mode of State Transition of Control Circuit

A first mode of state transition of the control circuits (41A, 42A, 51A, and 52A) according to this embodiment will be described below.

Here, it is assumed that breaking occurs in a power supply path to a specific control circuit in a period from a time point at which the start switch SW is turned off to a time point at which the start switch SW is turned on again while power latch control is being performed. The power supply path is a power supply path including the start switch SW. Accordingly, a source voltage is not supplied to the specific control circuit via the start switch SW. Accordingly, the specific control circuit cannot recognize the turning-on of the start switch SW. The specific control circuit does not start.

Figure 9:
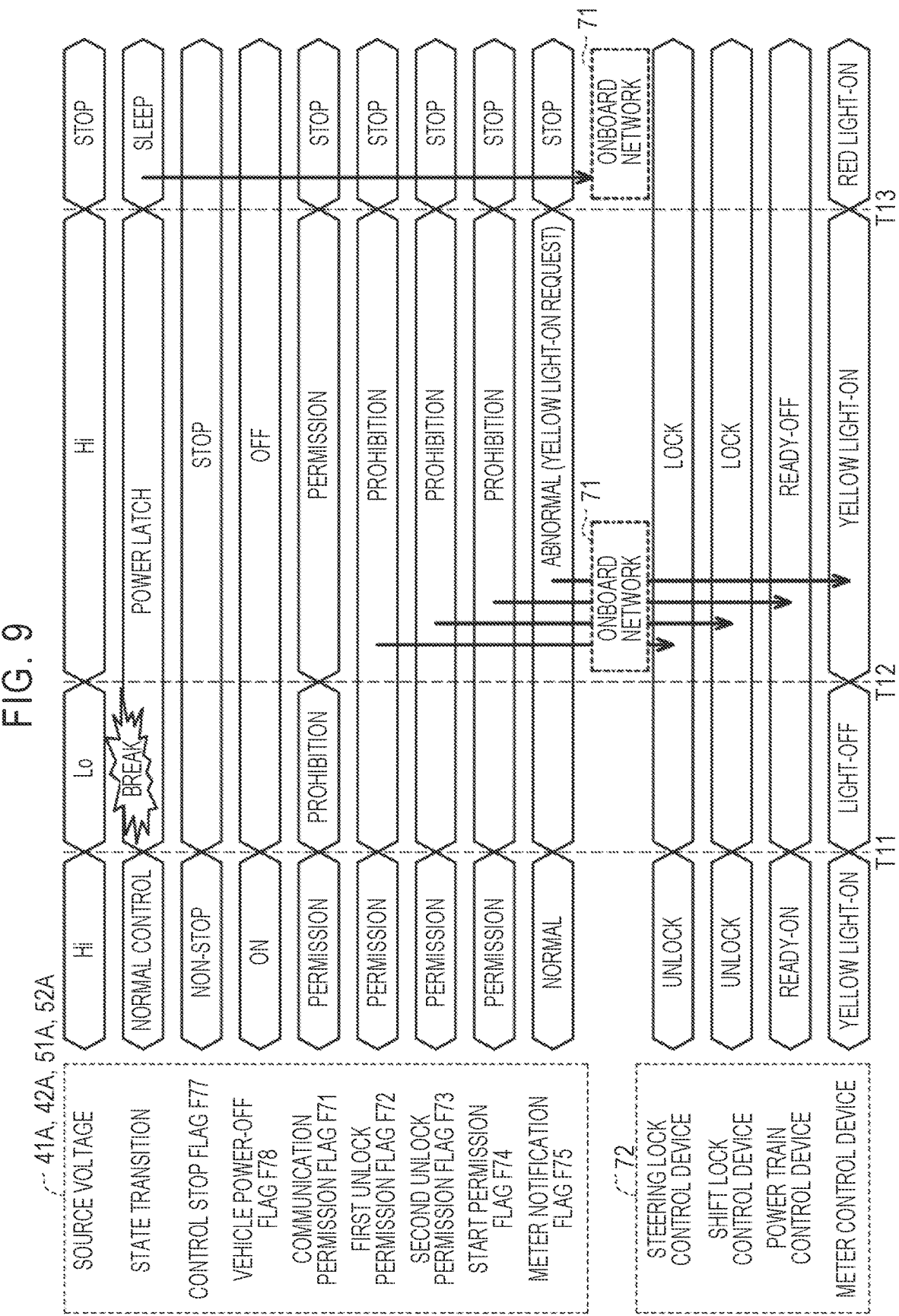
FIG. 9 is a timing chart illustrating a first mode of state transitions of control circuits according to a fourth embodiment.

As illustrated in the timing chart of FIG. 9, when the start switch SW is turned off in the state in which normal control is being performed (time T11), the control circuits perform power latch control. When the start switch SW is turned off, the level of the source voltage is switched from "Hi" to "Lo." Accordingly, the control circuits stop reaction control or turning control and switch the value of the control stop flag F77 from "non-stop" to "stop." The control circuits switch the value of the vehicle powering-off flag F78 from "ON" to "OFF." The control circuits switch the value of the communication permission flag F71 from "permitted" to "prohibited."

When all of the aforementioned three conditions C1 to C3 are satisfied, the control circuits initialize the values of the first unlock permission flag F72, the second unlock permission flag F73, the start permission flag F74, and the meter notification flag F75. That is, the control circuits switch the values of the first unlock permission flag F72, the second unlock permission flag F73, and the start permission flag F74 from "permitted" to "prohibited." The control circuits switch the value of the meter notification flag F75 to a value corresponding to the current state of the steer-by-wire system. Here, since breaking occurs in the power supply path to the specific control circuit, the value of the meter notification flag F75 is set to "abnormal." In addition, the value of the meter notification flag F75 may be set to a value such as a "yellow turn-on request" which is more specific instead of "abnormal."

When the start switch SW is turned on again in the period in which power latch control is being performed after the start switch SW has been turned off (time T12), the source voltage is not supplied to the specific control circuit via the power supply path including the start switch SW. Accordingly, the specific control circuit cannot recognize the turning-on of the start switch SW. The specific control circuit does not start.

Three control circuits other than the specific control circuit are supplied with the source voltage via power supply paths including the start switch SW. The three control circuits other than the specific control circuit set the value of the communication permission flag F71 to "permitted" when the source voltage supplied with the turning-on of the start switch SW reaches a value in the operating voltage range. Accordingly, the three control circuits other than the specific control circuit can perform communication via the onboard network 71.

When the value of the communication permission flag F71 is switched from "prohibited" to "permitted," the three control circuits other than the specific control circuit transmit the values of the first unlock permission flag F72, the second unlock permission flag F73, the start permission flag F74, and the meter notification flag F75 to the onboard system 72 via the onboard network 71.

However, the values of the first unlock permission flag F72, the second unlock permission flag F73, and the start permission flag F74 have been set to "prohibited" through initialization. Accordingly, the steering lock control device does not start the process of unlocking the steering wheel 11. The steering lock control device maintains the steering wheel 11 in the locked state. The shift lock control device does not start the process of unlocking the shift lever. The shift lock control device maintains the shift lever in the locked state. The power train control device does not start the process of starting the power train. The power train control device maintains the power train in the state of "READY-OFF," that is, the state in which the operation of the power train has been stopped.

Accordingly, the vehicle does not transition to the state in which the vehicle is able to travel even when the four control circuits (41A, 42A, 51A, and 52A) cannot start in the steer-by-wire system.

The meter control device switches the state of the indicator lamp from the turned-off state to a yellow turned-on state when the value of the meter notification flag F75 is set to "abnormal." A driver can visually recognize an abnormality in the steer-by-wire system immediately without waiting for completion of power latch control which is performed by the control circuits.

The same applies to a case in which the timings at which the four control circuits (41A, 42A, 51A, and 52A) recognize the turning-on of the start switch SW do not match. That is, there is concern that a control circuit that has earlier recognized the turning-on of the start switch SW may transmit the values of the first unlock permission flag F72, the second unlock permission flag F73, the start permission flag F74, and the meter notification flag F75 to the onboard system 72 via the onboard network 71. However, the values of the first unlock permission flag F72, the second unlock permission flag F73, and the start permission flag F74 have been set to "prohibited" through initialization. Accordingly, the vehicle does not transition to the state in which the vehicle is able to travel when the four control circuits do not start in the steer-by-wire system.

The same applies to a case in which the functions of setting the values of the permission flags (F72, F73, and F74) are distributed to the control circuits to be performed by the control circuits. For example, when only the second reaction control circuit 42A has the functions of setting the values of the first unlock permission flag F72 and the second unlock permission flag F73, it is assumed that the second reaction control circuit 42A recognizes the turning-on of the start switch SW earlier than the other three control circuits. In this case, there is concern that the second reaction control circuit 42A may transmit the value of the first unlock permission flag F72 and the value of the second unlock permission flag F73 to the onboard system 72 via the onboard network 71. However, the values of the first unlock permission flag F72 and the second unlock permission flag F73 have been set to "prohibited" through initialization. Accordingly, the steering wheel 11 and the shift lever are not unlocked when the four control circuits do not start in the steer-by-wire system. In addition, the same applies to a case in which breaking occurs in a power supply path to a specific control circuit other than the second reaction control circuit 42A. The power supply path is a power supply path including the start switch SW.

For example, when the second reaction control circuit 42A and the first turning control circuit 51A have the function of setting the value of the start permission flag F74, it is assumed that the second reaction control circuit 42A or the first turning control circuit 51A recognizes the turning-on of the start switch SW earlier than the other three control circuits. In this case, there is concern that the second reaction control circuit 42A or the first turning control circuit 51A may transmit the value of the start permission flag F74 to the onboard system 72 via the onboard network 71. However, the value of the start permission flag F74 has been set to "prohibited" through initialization. Accordingly, the power train of the vehicle is not started when the four control circuits do not start in the steer-by-wire system. In addition, the same applies to a case in which breaking occurs in a power supply path to a specific control circuit other than the second reaction control circuit 42A or the first turning control circuit 51A. The power supply path is a power supply path including the start switch SW.

Second Mode of State Transition of Control Circuit

A second mode of state transition of the control circuits (41A, 42A, 51A, and 52A) according to this embodiment will be described below.

Figure 10:
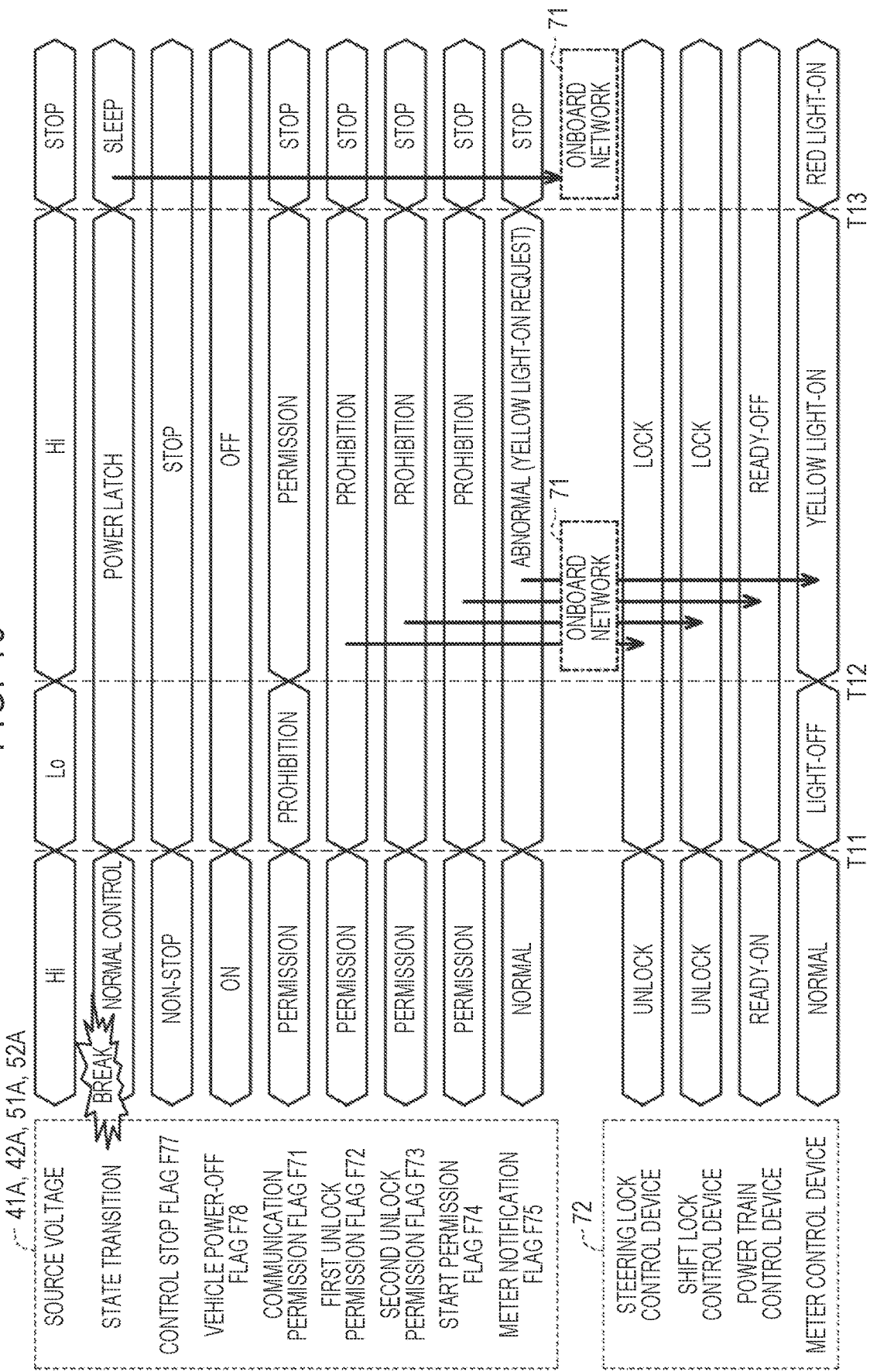
FIG. 10 is a timing chart illustrating a second mode of state transitions of the control circuits according to the fourth embodiment.

As illustrated in the timing chart of FIG. 10, supply of electric power to a specific control circuit may be stopped due to breaking of a power supply path to the specific control circuit while normal control is being performed immediately before the turning-off of the start switch SW. The power supply path is a power supply path including the start switch SW. When the start switch SW is turned off in this state and all of the three conditions C1 to C3 are satisfied, the control circuits initialize the values of the first unlock permission flag F72, the second unlock permission flag F73, the start permission flag F74, and the meter notification flag F75.

That is, the control circuits switch the values of the first unlock permission flag F72, the second unlock permission flag F73, and the start permission flag F74 from "permitted" to "prohibited." The control circuits switch the value of the meter notification flag F75 to a value corresponding to the current state of the steer-by-wire system. Here, since breaking occurs in the power supply path to the specific control circuit, the value of the meter notification flag F75 is set to "abnormal."

In the case where the start switch SW is turned on again in the period in which power latch control is being performed after the start switch SW has been turned off, the control circuits perform the same process as in the first mode illustrated in FIG. 9. That is, three control circuits other than the specific control circuit transmit the values of the first unlock permission flag F72, the second unlock permission flag F73, the start permission flag F74, and the meter notification flag F75 to the onboard system 72 via the onboard network 71 when the value of the communication permission flag F71 is switched from "prohibited" to "permitted."

However, the values of the first unlock permission flag F72, the second unlock permission flag F73, and the start permission flag F74 have been set to "prohibited" through initialization. Accordingly, the vehicle does not transition to the state in which the vehicle is able to travel when the four control circuits do not start in the steer-by-wire system. The same applies to a case in which the functions of setting the values of the permission flags (F72, F73, and F74) are distributed to the control circuits to be performed by the control circuits. That is, the steering wheel 11 and the shift lever are not unlocked and the power train is not started when the control circuits do not start in the steer-by-wire system.

Advantages of Fourth Embodiment

Accordingly, the following advantages can be achieved in the fourth embodiment. (4-1) When the start switch SW is turned off, the control circuits (41A, 42A, 51A, and 52A) initialize the values of the first unlock permission flag F72, the second unlock permission flag F73, and the start permission flag F74. That is, the control devices set the values of the first unlock permission flag F72, the second unlock permission flag F73, and the start permission flag F74 to "prohibited."

Here, when the start switch SW is turned on again in the period in which power latch control is being performed after the start switch SW has been turned off and there is a control circuit that has not recognized the turning-on of the start switch SW, the control circuits do not start in the steer-by-wire system. However, another control circuit that has recognized the turning-on of the start switch SW may transmit the values of the permission flags (F72, F73, and F74) to the onboard system 72.

At this time, since the values of the permission flags (F72, F73, and F74) have been set to "prohibited," the steering wheel 11 and the shift lever are not unlocked and the power train is not started. Accordingly, it is possible to prevent the vehicle from transitioning to the state in which the vehicle is able to travel or to prevent the process of causing the vehicle to transition to the state in which the vehicle is able to travel from being performed when the control circuits do not start in the steer-by-wire system.

(4-2) When the start switch SW is turned off, the control circuits (41A, 42A, 51A, and 52A) initialize the value of the meter notification flag F75. That is, the control circuits switch the value of the meter notification flag F75 to a value corresponding to the current state of the steer-by-wire system. For example, when breaking of a power supply path to a specific control circuit is detected at a time point at which the start switch SW is turned off, the control circuits set the value of the meter notification flag F75 to "abnormal." In the case where the start switch SW is turned on again in the period in which power latch control is being performed after the start switch SW has been turned off, a control circuit that has recognized the turning-on of the start switch SW transmits the value of the meter notification flag F75 to the onboard system 72. The meter control device switches the state of the indicator lamp from the turned-off state to the turned-on state indicating an abnormality of the steer-by-wire system when the value of the meter notification flag F75 has been set to "abnormal." The turned-on state indicating an abnormality is, for example, a yellow turned-on state. Accordingly, a driver can visually recognize an abnormality of the steer-by-wire system immediately without waiting for completion of power latch control which is performed by the control circuits.

Fifth Embodiment

A fifth embodiment in which a control device for a vehicle is embodied for a steer-by-wire steering system will be described below. This embodiment basically has the same configuration as in the first embodiment illustrated in FIGS. 1 to 3. The same elements as in the first embodiment will be referred to by the same reference signs, and detailed description thereof will be omitted.

This embodiment is different from the third embodiment in contents of the processes which are performed by the control circuits (41A, 42A, 51A, and 52A) when the start switch SW is turned on. The control circuits set a value of a start state flag F79 when the start switch SW is turned on. The start state flag F79 is information indicating whether all the control circuits have recognized the turning-on of the start switch SW. The control circuits mutually confirm whether they have recognized the turning-on of the start switch SW, that is, whether they have recognized the powering-on of the vehicle, through the first mutual confirmation MC1, the second mutual confirmation MC2, the third mutual confirmation MC3, and the fourth mutual confirmation MC4 which are illustrated in FIG. 3. When it is determined that at least one of the control circuits has not recognized the turning-on of the start switch SW, the control circuits set the value of the start state flag F79 to "non-start." When the value of the start state flag F79 is set to "non-start," it means that the control circuits do not start in the steer-by-wire system. When it is determined that all the control circuits have recognized the turning-on of the start switch SW, the control circuits set the value of the start state flag F79 to "start." When the value of the start state flag F79 is set to "start," it means that the control circuits can start in the steer-by-wire system.

A first mode of state transition of the control circuits (41A, 42A, 51A, and 52A) according to this embodiment will be described below. Here, it is assumed that breaking occurs in a power supply path to a specific control circuit in a period from a time point at which the start switch SW is turned off to a time point at which the start switch SW is turned on again while power latch control is being performed. The power supply path is a power supply path including the start switch SW. Accordingly, a source voltage is not supplied to the specific control circuit via the start switch SW. Accordingly, the specific control circuit cannot recognize the turning-on of the start switch SW. The specific control circuit does not start.

Figure 11:
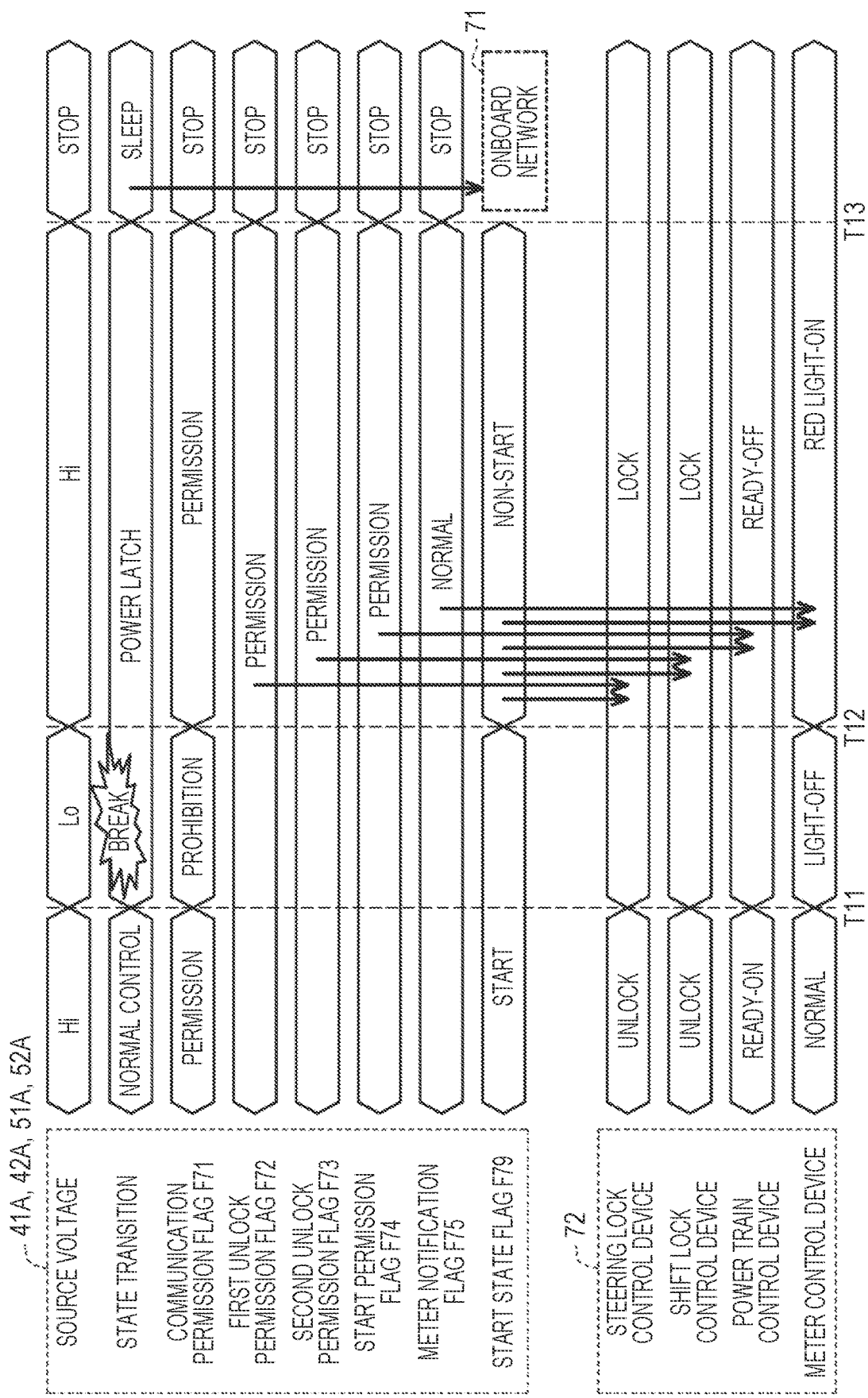
FIG. 11 is a timing chart illustrating a first mode of state transitions of control circuits according to a fifth embodiment.

As illustrated in the timing chart of FIG. 11, when the start switch SW is turned off in the state in which normal control is being performed (time T11), the control circuits perform power latch control. When the start switch SW is turned off, the level of the source voltage is switched from "Hi" to "Lo." When the level of the source voltage is switched from "Hi" to Lo," the control circuits switch the value of the communication permission flag F71 from "permitted" to "prohibited."

While power latch control is being performed, the value of the first unlock permission flag F72, the value of the second unlock permission flag F73, the value of the start permission flag F74, and the value of the meter notification flag F75 are maintained at the same values as the values set during normal control performed immediately before the turning-off of the start switch SW. That is, the value of the first unlock permission flag F72, the value of the second unlock permission flag F73, and the value of the start permission flag F74 are maintained at "permitted." The value of the meter notification flag F75 is maintained at "normal." The value of the start state flag F79 is maintained at "start."

When the start switch SW is turned on again in the period in which power latch control is being performed after the start switch SW has been turned off (time T12), the source voltage is not supplied to the specific control circuit via the power supply path including the start switch SW. Accordingly, the specific control circuit cannot recognize the turning-on of the start switch SW. Accordingly, the specific control circuit does not start.

Three control circuits other than the specific control circuit are supplied with the source voltage via power supply paths including the start switch SW. Here, since the specific control circuit cannot recognize the turning-on of the start switch SW, a situation in which all the control circuits recognize the turning-on of the start switch SW cannot occur. Accordingly, the three control circuits other than the specific control circuit set the value of the start state flag F79 to "non-start."

When the source voltage supplied due to the turning-on of the start switch SW reaches a value in the operating voltage range, the three control circuits other than the specific control circuit set the value of the communication permission flag F71 to "permitted." Accordingly, the three control circuits other than the specific control circuit can perform communication via the onboard network 71.

When the value of the communication permission flag F71 is switched from "prohibited" to "permitted," the three control circuits other than the specific control circuit transmit the values of the first unlock permission flag F72, the second unlock permission flag F73, the start permission flag F74, the meter notification flag F75, and the start state flag F79 to the onboard system 72 via the onboard network 71. The process of transmitting the value of the start state flag F79 set to "non-start" to the onboard system 72 is a process for requesting the onboard system 72 to ignore the values of the first unlock permission flag F72, the second unlock permission flag F73, and the start permission flag F74.

Accordingly, when the value of the start state flag F79 is set to "non-start," the onboard system 72 ignores the values of the first unlock permission flag F72, the second unlock permission flag F73, and the start permission flag F74. That is, the onboard system 72 does not operate even when the value of the first unlock permission flag F72, the value of the second unlock permission flag F73, and the value of the start permission flag F74 are set to "permitted."

That is, the steering lock control device does not perform the process of unlocking the steering wheel 11. Accordingly, the steering wheel 11 is maintained in the locked state. The shift lock control device does not perform the process of unlocking the shift lever. Accordingly, the shift lever is maintained in the locked state. The power train control device does not perform the process of starting the power train. Accordingly, the power train is maintained in the stopped state.

Accordingly, the vehicle does not transition to the state in which the vehicle is able to travel when the four control circuits (41A, 42A, 51A, and 52A) cannot start in the steer-by-wire system.

When the start switch SW is turned on and the value of the start state flag F79 is set to "non-start," the meter control device switches the state of the indicator lamp from the turned-off state to, for example, the red turned-on state. This is because, when the value of the start state flag F79 is set to "non-start," it indicates a state in which the control circuits cannot start in the steer-by-wire system. A driver can visually recognize an abnormality in the steer-by-wire system immediately without waiting for completion of power latch control which is performed by the control circuits.

The same applies to a case in which the timings at which the four control circuits (41A, 42A, 51A, and 52A) recognize the turning-on of the start switch SW do not match. That is, there is concern that a control circuit that has earlier recognized the turning-on of the start switch SW may transmit the values of the flags (F72, F73, F74, F75, and F79) to the onboard system 72 via the onboard network 71. However, when there is a control circuit that has not recognized the turning-on of the start switch SW, the value of the start state flag F79 is set to "non-start." Accordingly, even when the permission flags (F72, F73, and F74) set to "permitted" are transmitted to the onboard system 72, the onboard system 72 does not operate. Accordingly, the vehicle does not transition to the state in which the vehicle is able to travel when the four control circuits do not start in the steer-by-wire system.

The same applies to a case in which the functions of setting the values of the permission flags (F72, F73, and F74) are distributed to the control circuits to be performed by the control circuits. For example, when only the second reaction control circuit 42A has the functions of setting the values of the first unlock permission flag F72 and the second unlock permission flag F73, it is assumed that the second reaction control circuit 42A recognizes the turning-on of the start switch SW earlier than the other three control circuits. In this case, there is concern that the second reaction control circuit 42A may transmit the value of the first unlock permission flag F72 and the value of the second unlock permission flag F73 to the onboard system 72 via the onboard network 71.

However, when there is a control circuit that has not recognized the turning-on of the start switch SW, the value of the start state flag F79 is set to "non-start." Accordingly, even when the value of the first unlock permission flag F72 set to "permitted" is transmitted to the onboard system 72, the steering lock control device does not perform the process of unlocking the steering wheel 11. Even when the value of the second unlock permission flag F73 set to "permitted" is transmitted to the onboard system 72, the shift lock control device does not perform the process of unlocking the shift lever. Accordingly, when the four control circuits do not start in the steer-by-wire system, the steering wheel 11 is not unlocked and the shift lever is not unlocked. In addition, the same applies to the case where breaking occurs in the power supply path to the specific control circuit other than the second reaction control circuit 42A. The power supply path is a power supply path including the start switch SW.

For example, when the second reaction control circuit 42A and the first turning control circuit 51A have the function of setting the value of the start permission flag F74, it is assumed that the second reaction control circuit 42A or the first turning control circuit 51A recognizes the turning-on of the start switch SW earlier than the other three control circuits. In this case, there is concern that the second reaction control circuit 42A or the first turning control circuit 51A may transmit the value of the start permission flag F74 to the onboard system 72 via the onboard network 71.

However, when there is a control circuit that has not recognized the turning-on of the start switch SW, the value of the start state flag F79 is set to "non-start." Accordingly, even when the start permission flag F74 set to "permitted" is transmitted to the onboard system 72, the power train control device does not perform the process of operating the power train. Accordingly, when the four control circuits do not start in the steer-by-wire system, the power train does not start. In addition, the same applies to a case in which breaking occurs in a power supply path to a specific control circuit other than the second reaction control circuit 42A or the first turning control circuit 51A. The power supply path is a power supply path including the start switch SW.

Second Mode of State Transition of Control Circuit

A second mode of state transition of the control circuits (41A, 42A, 51A, and 52A) according to this embodiment will be described below.

Figure 12:
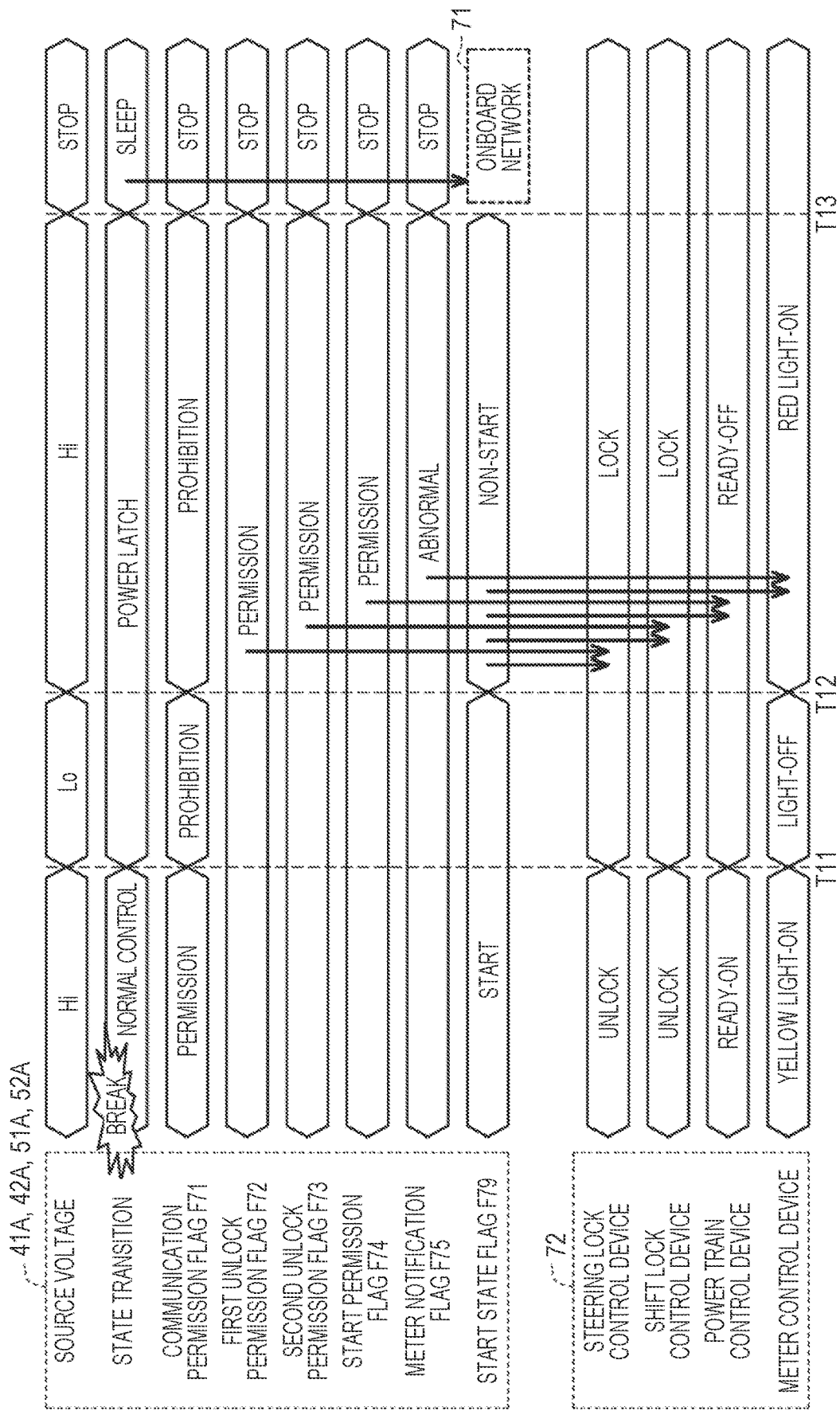
FIG. 12 is a timing chart illustrating a second mode of state transitions of the control circuits according to the fifth embodiment.

As illustrated in the timing chart of FIG. 12, there may be a situation in which a specific control circuit cannot recognize turning-on of the start switch SW due to breaking of a power supply path to the specific control circuit while normal control is being performed immediately before the turning-off of the start switch SW. The power supply path is a power supply path including the start switch SW. In this case, when the start switch is turned off, the control circuits perform the same process as in the first mode illustrated in FIG. 11. That is, when at least one of the control circuits does not recognize the turning-off of the start switch SW, the control circuits set the value of the start state flag F79 to "non-start."

Accordingly, the vehicle does not transition to the state in which the vehicle is able to travel when the four control circuits do not start in the steer-by-wire system. The same applies to a case in which the functions of setting the values of the permission flags (F72, F73, and F74) are distributed to the control circuits to be performed by the control circuits. That is, the steering wheel 11 and the shift lever are not unlocked and the power train is not started when the control circuits do not start in the steer-by-wire system.

Advantages of Fifth Embodiment

Accordingly, the following advantages can be achieved in the fifth embodiment. (5-1) When the start switch SW is turned on and there is at least one control circuit that has not recognized the turning-on of the start switch SW, the control circuits (41A, 42A, 51A, and 52A) set the value of the start state flag F79 to "non-start." When the value of the start state flag F79 is set to "non-start," the onboard system 72 ignores the values of the first unlock permission flag F72, the second unlock permission flag F73, and the start permission flag F74. Accordingly, it is possible to prevent the vehicle from transitioning to the state in which the vehicle is able to travel or to prevent the process of causing the vehicle to transition to the state in which the vehicle is able to travel from being performed when the control circuits do not start in the steer-by-wire system.

(5-2) The meter control device switches the state of the indicator lamp from the turned-off state to the red turned-on state when the start switch SW is turned on and value of the start state flag F79 is set to "non-start." This is because, when the value of the start state flag F79 is set to "non-start," it indicates that the control circuits cannot start in the steer-by-wire system. Accordingly, a driver can visually recognize an abnormality in the steer-by-wire system immediately without waiting for completion of power latch control in the control circuits.

Other Embodiments

The aforementioned embodiments may be modified as follows. In the first embodiment and the third to fifth embodiments, the initial sequence which is performed at the time of starting by the control circuits (41A, 42A, 51A, and 52A) may include a midpoint learning process and a steering angle synchronizing process.

The midpoint learning process is a process of learning a steering neutral position of the steering wheel 11. The steering system 10 includes a stopper mechanism configured to restrict rotation of the steering wheel 11 to provide a limit of a steering angle of the steering wheel 11. The stopper mechanism limits a steering range of the steering wheel 11 to, for example, a range less than 360°. The reaction control device 40 causes the steering wheel 11 to operate to a first operation end and then to return to a second operation end through the control of the reaction motor 21. Thereafter, the reaction control device 40 calculates a midpoint of the steering angle based on the rotation angles of the reaction motor 21 at a start time point and an end time point of the return operation of the steering wheel 11. The midpoint of the steering angle corresponds to a motor midpoint which is a rotational position of the reaction motor 21 at a time when the steering wheel 11 is located at the steering neutral position. The reaction control device 40 stores the midpoint of the steering angle or the motor midpoint as the steering neutral position of the steering wheel 11 in the memory.

Here, the reaction control device 40 learns the steering neutral position of the steering wheel 11 when information regarding the steering neutral position stored in the memory is lost. This time corresponds to, for example, a time point at which the vehicle is firstly powered on after a battery is newly attached to the vehicle. This is because information regarding the steering neutral position stored in the memory of the reaction control device 40 is lost due to non-supply of electric power to the reaction control device 40 when the battery is detached from the vehicle for replacement of the battery.

Depending on product specifications or the like, the reaction control device 40 may perform the midpoint learning process when the vehicle is powered on and may perform the midpoint learning process when reliability of information regarding the steering neutral position stored in the memory decreases.

The steering angle synchronizing process is a process of correcting the rotational position of the steering wheel 11. The reaction control device 40 drives the reaction motor 21 such that the rotational position of the steering wheel 11 reaches the rotational position corresponding to the turning position of the turning wheels 15 when the rotational position of the steering wheel 11 is a position different from the rotational position corresponding to the turning position of the turning wheels 15.

For example, when the vehicle is powered off, the reaction control device 40 stores the steering angle θs detected immediately before the vehicle is powered off, as a reference steering angle. The reference steering angle is a reference for determining whether the steering wheel 11 has rotated in the period in which the vehicle is in a powered-off state. When the steering angle θs does not match the reference steering angle immediately after the vehicle is powered on, the reaction control device 40 calculates a difference between the steering angle θs and the reference steering angle immediately after the vehicle is powered on and controls supply of electric power to the reaction motor 21 such that the difference is cancelled out.

The reaction control device 40 may calculate a difference between the value of the steering angle θs immediately after the vehicle is powered on and a value obtained by multiplying the turning angle θw immediately after the vehicle is powered on by a reciprocal of the steering angle ratio and control supply of electric power to the reaction motor 21 such that the difference is cancelled out.

In the first embodiment, the reaction motor 21 and the turning motor 31 include the winding groups of two systems, but may include a winding group of a system. In this case, the reaction control device 40 may include only one of the first system circuit 41 and the second system circuit 42. In this case, the turning control device 50 may include only one of the first system circuit 51 and the second system circuit 52. Here, when the reaction control device 40 includes only the first system circuit 41, for example, the turning control device 50 may include only the first system circuit 51. The first reaction control circuit 41A sets the value of the flag F11 based on the result of determination as to whether the start switch SW has been turned on. The first turning control circuit 51A sets the value of the flag F31 based on the result of determination as to whether the start switch SW has been turned on. The first reaction control circuit 41A and the first turning control circuit 51A determine that both the first reaction control circuit 41A and the first turning control circuit 51A have recognized that the start switch SW has been turned on when both the value of the flag F11 and the value of the flag F31 are "1." The first reaction control circuit 41A and the first turning control circuit 51A start in response to this determination. Accordingly, in the case where the vehicle is powered on while power latch control is being performed after the vehicle has been powered off, it is possible to match the timings at which the first reaction control circuit 41A and the first turning control circuit 51A start even when the timings at which the first reaction control circuit 41A and the first turning control circuit 51A recognize the powering-on of the vehicle are different. The same applies to the case where the reaction control device 40 includes only the second system circuit 42 and the turning control device 50 includes only the second system circuit 52. Accordingly, it is possible to appropriately control driving of the reaction motor and the turning motor. The first reaction control circuit 41A or the second reaction control circuit 42A is an example of a reaction control circuit. The first turning control circuit 51A or the second turning control circuit 52A is an example of a turning control circuit. This configuration may be applied to the third to fifth embodiments.

In the first embodiment, the control circuits (41A, 42A, 51A, and 52A) may determine whether all the control circuits have recognized the powering-on of the vehicle by mutually confirming the values of the flags (F11, F21, F31, and F41). In this case, the first reaction control circuit 41A and the second turning control circuit 52A are provided such that they can transmit and receive information via a communication line. The second reaction control circuit 42A and the first turning control circuit 51A are provided such that they can transmit and receive information via a communication line. This configuration may be applied to the third to fifth embodiments.

In the first embodiment, a specific control circuit among the control circuits (41A, 42A, 51A, and 52A) may determine whether all the control circuits have recognized the powering-on of the vehicle by confirming the values of the flags of the other control circuits. The specific control circuit notifies the other control circuits of the result of determination as to whether all the control circuits have recognized the powering-on of the vehicle. In this case, the first reaction control circuit 41A and the second turning control circuit 52A or the second reaction control circuit 42A and the first turning control circuit 51A are provided such that they can transmit and receive information via a communication line. This configuration may be applied to the third to fifth embodiments.

The control device for a vehicle is embodied in the steer-by-wire steering system in the first embodiment and the control device for a vehicle is embodied in the electric power steering system in the second embodiment, but the control device for a vehicle may be embodied, for example, in a door mirror system that is opened and closed along with a door lock. The control device for a vehicle can be embodied in all onboard systems requiring state transition synchronized among a plurality of control circuits. An event serving as a trigger for synchronized state transition is not limited to powering-on of the vehicle. In the third to fifth embodiments, similarly to the first and second embodiments, the control device for a vehicle can be embodied in all onboard systems requiring state transition synchronized among a plurality of control circuits.

What is claimed is:

1. A control device for a vehicle, the control device comprising
   a plurality of control circuits configured to start in response to powering-on of the vehicle to control a control object, and to perform power latch control for continuing to be supplied with electric power in a predetermined period in response to powering-off of the vehicle,
   wherein each of the control circuits is configured to mutually confirm whether the powering-on of the vehicle has been recognized, and to perform starting after all of the control circuits have recognized the powering-on of the vehicle when the vehicle is powered on while the power latch control is being performed after the vehicle has been powered off.

2. The control device according to claim 1, wherein:
   the control circuits are configured to set values of flags based on results of recognition as to whether the vehicle has been powered on; and
   each of the control circuits is configured to determine whether all of the control circuits have recognized the powering-on of the vehicle based on the values of the flags.

3. The control device according to claim 1, wherein:
   the control object includes winding groups of two systems;
   the control object includes
   a reaction motor that generates a steering reaction force that is applied to a steering wheel of a steer-by-wire steering system of the vehicle in which transmission of power between the steering wheel of the vehicle and turning wheels of the vehicle is cut off, and
   a turning motor that generates a turning force for turning the turning wheels; and
   the control circuits include
   a first reaction control circuit configured to control supply of the electric power to a winding group of a first system in the reaction motor,
   a second reaction control circuit configured to control supply of the electric power to a winding group of a second system in the reaction motor,
   a first turning control circuit configured to control supply of the electric power to a winding group of the first system in the turning motor, and
   a second turning control circuit configured to control supply of the electric power to a winding group of the second system in the turning motor.

4. The control device according to claim 3, wherein:
   the first reaction control circuit and the second reaction control circuit are configured to perform first mutual confirmation of mutually confirming whether the powering-on of the vehicle has been recognized;
   the first turning control circuit and the second turning control circuit are configured to perform second mutual confirmation of mutually confirming whether the powering-on of the vehicle has been recognized;
   the first reaction control circuit and the first turning control circuit are configured to perform third mutual confirmation of mutually confirming whether the first mutual confirmation and the second mutual confirmation have succeeded and to determine that the powering-on of the vehicle has been recognized by all the control circuits when the first mutual confirmation and the second mutual confirmation have succeeded; and
   the second reaction control circuit and the second turning control circuit are configured to perform fourth mutual confirmation of mutually confirming whether the first mutual confirmation and the second mutual confirmation have succeeded and to determine that the powering-on of the vehicle has been recognized by all the control circuits when the first mutual confirmation and the second mutual confirmation have succeeded.

5. The control device according to claim 1, wherein:
   the control object includes (i) a reaction motor that is a source of a steering reaction force that is applied to a steering wheel of a steer-by-wire steering system of the vehicle in which transmission of power between the steering wheel of the vehicle and turning wheels of the vehicle is cut off, and (ii) a turning motor that is a source of a turning force for turning the turning wheels; and
   the control circuits include (a) a reaction control circuit configured to control the reaction motor and (b) a turning control circuit configured to control the turning motor.

6. The control device according to claim 1, wherein:
   the control object includes an assist motor that generates an assist force for assisting an operation of a steering wheel of the vehicle;
   the assist motor includes a winding group of a first system and a winding group of a second system; and
   the control circuits includes a first assist control circuit configured to control supply of the electric power to the winding group of the first system and a second assist control circuit configured to control supply of the electric power to the winding group of the second system.

7. The control device according to claim 1, wherein:
the control circuits are configured to be able to perform communication with an onboard system that performs a process of causing the vehicle to transition to a state in which the vehicle is able to travel; and
each of the control circuits is configured to be permitted to communicate with the onboard system after all of the control circuits have recognized the powering-on of the vehicle in the case where the vehicle is powered on while the power latch control is being performed after the vehicle has been powered off.

8. A control device for a vehicle, the control device comprising:
a plurality of control circuits configured to start in response to powering-on of the vehicle to control a control object, and to perform power latch control for continuing to be supplied with electric power in a predetermined period in response to powering-off of the vehicle, wherein
each of the control circuits is configured to perform starting after all of the control circuits have recognized the powering-on of the vehicle when the vehicle is powered on while the power latch control is being performed after the vehicle has been powered off;
the control circuits are configured to be able to perform communication with an onboard system that performs a process of causing the vehicle to transition to a state in which the vehicle is able to travel and to be permitted to communicate with the onboard system when the vehicle is powered on;
the control circuits include information indicating whether the onboard system is permitted to perform the process; and
the control circuits are configured to change contents of the information from (i) contents for permitting the onboard system to perform the process to (ii) contents for prohibiting the onboard system from performing the process as an initialization process for the information in a case where the vehicle is powered off while control of the control object is being performed, and to transmit the information to the onboard system when the vehicle is powered on while the power latch control is being performed after the vehicle has been powered off.

9. A control device for a vehicle, the control device comprising:
a plurality of control circuits configured to start in response to powering-on of the vehicle to control a control object, and to perform power latch control for continuing to be supplied with electric power in a predetermined period in response to powering-off of the vehicle, wherein
each of the control circuits is configured to perform starting after all of the control circuits have recognized the powering-on of the vehicle when the vehicle is powered on while the power latch control is being performed after the vehicle has been powered off;
the control circuits are configured to be able to perform communication with an onboard system that performs a process of causing the vehicle to transition to a state in which the vehicle is able to travel and to be permitted to communicate with the onboard system when the vehicle is powered on;
the control circuits include information indicating whether the onboard system is permitted to perform the process;
the control circuits are configured to maintain contents of the information set during control of the control object such that the contents are maintained to be contents for permitting the onboard system to perform the process, when the vehicle is powered off while the control of the control object is being performed, and to transmit the information to the onboard system in the case where the vehicle is powered on while the power latch control is being performed after the vehicle has been powered off; and
each of the control circuits is configured to perform a process of requesting the onboard system to ignore the information when not all of the control circuits have recognized the powering-on of the vehicle in the case where the vehicle is powered on while the power latch control is being performed after the vehicle has been powered off.

* * * * *